(12) United States Patent
Wurman et al.

(10) Patent No.: US 11,483,686 B2
(45) Date of Patent: Oct. 25, 2022

(54) SYSTEM AND METHODS FOR REMOTE INTERACTION WITH PORTABLE FIELD MEASUREMENT EQUIPMENT

(71) Applicant: ENGEO Incorporated, San Ramon, CA (US)

(72) Inventors: Gilead Wurman, Union City, CA (US); Michael John Price, Palo Alto, CA (US); Joseph Gray, Lafayette, CA (US)

(73) Assignee: ENGEO INCORPORATED, San Ramon, CA (US)

( * ) Notice: Subject to any disclaimer, the term of this patent is extended or adjusted under 35 U.S.C. 154(b) by 528 days.

(21) Appl. No.: 16/680,367

(22) Filed: Nov. 11, 2019

(65) Prior Publication Data
US 2020/0162863 A1 May 21, 2020

Related U.S. Application Data

(60) Provisional application No. 62/769,401, filed on Nov. 19, 2018.

(51) Int. Cl.
*H04W 4/029* (2018.01)
*H04W 4/38* (2018.01)
(Continued)

(52) U.S. Cl.
CPC ............... *H04W 4/38* (2018.02); *G01M 5/00* (2013.01); *G01S 19/13* (2013.01); *G06F 3/023* (2013.01); *H04W 4/029* (2018.02)

(58) Field of Classification Search
CPC ......... H04W 4/38; H04W 4/029; G01M 5/00; G01S 19/13; G06F 3/023; G01D 18/00
(Continued)

(56) References Cited

U.S. PATENT DOCUMENTS 5,112,454 A * 5/1992 Tanaka ............... G01N 33/4915
204/411
5,804,971 A * 9/1998 Cumming ............ G01N 27/286
324/438
(Continued)

FOREIGN PATENT DOCUMENTS

KR 10-2015-0123107 A 11/2015
KR 10-2016-0081579 A 7/2016

OTHER PUBLICATIONS

International Search Report and Written Opinion, re PCT Application No. PCT/US2019/061151 dated Mar. 11, 2020 in 7 pages.

*Primary Examiner* — Amancio Gonzalez
(74) *Attorney, Agent, or Firm* — Knobbe, Martens, Olson & Bear, LLP

(57) ABSTRACT

Example systems are described for remotely interacting with a portable field measurement device. Systems can include a controller that can: couple to a mobile device; receive user input from a user through the mobile device; cause the portable field measurement device to execute the operations directed by the user; electronically record data output from the portable field measurement device resulting from the directed operations; and report the data to the user via the mobile device, and/or to a remote electronic database. In some embodiments, a robotic arm can be used to actuate the portable field measurement device.

20 Claims, 19 Drawing Sheets

(51) Int. Cl.
  *G01M 5/00* (2006.01)
  *G06F 3/023* (2006.01)
  *G01S 19/13* (2010.01)

(58) Field of Classification Search
  USPC .......................................................... 73/866
  See application file for complete search history.

(56) References Cited

U.S. PATENT DOCUMENTS

| | | | |
|---|---|---|---|
| 6,253,959 B1* | 7/2001 | Gaultney | G01G 13/026 |
| | | | 222/413 |
| 7,927,883 B2* | 4/2011 | Tuli | G01V 9/00 |
| | | | 436/171 |
| 9,383,308 B2* | 7/2016 | Bradley | G01J 3/2803 |
| 10,578,599 B2* | 3/2020 | Wenzel | G01N 33/24 |
| 2004/0132204 A1* | 7/2004 | Chou | G01N 27/4148 |
| | | | 436/163 |
| 2009/0322557 A1 | 12/2009 | Robb et al. | |
| 2012/0001646 A1* | 1/2012 | Bolander | G01R 31/2621 |
| | | | 324/705 |
| 2014/0345394 A1* | 11/2014 | Schildroth | G01N 33/24 |
| | | | 73/863 |
| 2017/0180913 A1 | 6/2017 | Tan et al. | |

* cited by examiner

SYSTEM AND METHODS FOR REMOTE INTERACTION WITH PORTABLE FIELD MEASUREMENT EQUIPMENT

RELATED APPLICATIONS

This application claims the benefit of U.S. Patent Provisional Application No. 62/769,401, filed Nov. 19, 2018, the entire contents of which are hereby expressly incorporated by reference herein in its entirety and for all purposes. In addition, any and all applications for which a foreign or domestic priority claim is identified in the application data sheet as filed with the present application are also expressly incorporated by reference.

BACKGROUND

The process of grading and construction sometimes requires testing of materials to ensure conformance with project specifications and/or industry best practices. Some of this testing can be done by sampling the material in question and testing it in a laboratory, but often the testing must be done in situ, or at the location of the material in question. A number of portable measurement devices have been developed to measure the physical properties of various construction-related materials (for example, soil, aggregate, concrete, reinforcing steel, and other similar materials) in the field.

Example parameters that may require in situ testing and measurement can be the moisture and density of compacted fill materials (such as soil and produced sand, aggregate, and asphaltic concrete). The long-term performance of roads and built structures, such as buildings and infrastructure, depends in large part on properly preparing the surface and subsurface soil and properly placing additional fill materials on top of the subsurface soil to establish design grades. The fill material prepared and placed during construction should have the correct moisture content and should be sufficiently compacted, prior to being covered by another layer of compacted material or by a structure, road, or other facility to minimize future settlement once a structure is built on top of the compacted material.

SUMMARY

The systems, methods, and devices of the disclosure each have several innovative aspects, no single one of which is solely responsible for the desirable attributes disclosed herein.

A common technique for determining the compaction of material involves the use of a nuclear density gauge which determines the degree of compaction of compactable materials by measuring the transmission and/or backscattering of radiogenic particles through a known quantity of in-place material. These gauges can be certified under ASTM Testing Standard D6938, for example.

Currently available portable field measurement devices typically do not incorporate modern technologies like Global Navigation Satellite Systems (GNSS) or digital communications. The portable field measurement devices that do incorporate GNSS do not produce locations that are accurate enough to meet the standard of practice for geolocating in situ tests. It should be appreciated that nuclear density gauges, as described herein, generally lack modern technologies, which include one or more of the following: GNSS, Internet connectivity, portable electronic device interface via Wi-Fi or Bluetooth, electronic input control, and electronic reporting of outputs. Also, in some circumstances some nuclear density gauges include serial connections, such as serial-over-bluetooth and serial-over-USB for the transmission or printing of outputs. In some examples, the output can be actuated from a physical keypad.

In order to run a test using existing portable field measurement devices, a user currently must: map the test location, either through an external GPS, for example, one embedded in a portable electronic device, or by orienting themselves to their location with respect to a digital or paper plan of the project area; determine their elevation, typically with respect to previously surveyed markers such as grade stakes; position and set-up the portable field measurement device appropriately; actuate a test by pressing physical keys on the portable field measurement device; monitor the test for completion on an embedded display, for example, an LCD, or the like; manually copy the results of the test from the embedded display to a field notebook or portable electronic device, along with location and elevation information; and either upload the test results from the portable electronic device to a project database via the Internet, or manually enter the record from the field notebook into a computer or portable electronic device for subsequent upload to a project database via the Internet.

One embodiment of a controller for controlling a portable field measurement device is disclosed. The controller may comprise: an attachment mechanism configured to couple to a compatible receiving mechanism on the portable field measurement device; a geolocation sensor; a first communication interface configured to communicate with the portable field measurement device; a second communication interface configured to communicate with a mobile device; one or more data storage devices configured to store: test results; and a plurality of computer-executable instructions; one or more hardware computer processors, in communication with the one or more data storage devices, that when executing the plurality of computer executable instructions, are configured to: electronically couple, via the first communication interface, to the portable field measurement device such that the controller and the portable field measurement device electronically communicate, wherein the portable field measurement device is physically positioned to be able to test a first material; couple, via the attachment mechanism, the controller to the portable field measurement device to the receiving mechanism; electronically couple, via the second communication interface, to a mobile device; store geolocation data output by the geolocation sensor; access, via the mobile device, a test request comprising testing criteria; actuate one or more keypresses on a keypad of the portable field measurement device based at least in part on the test request so that the portable field measurement device runs the testing procedure on the first material; receive, via the first communication interface, test data from the portable field measurement device; generate and store, in one or more data storage devices, test results based at least in part on the test data and the geolocation data; generate and transmit, to the mobile device via second communication interface, instructions for display of the test results on a graphical user interface associated with the mobile device. The controller can also include additional configurations, such as: the portable field measurement device is a device for measuring the physical properties of soil, sand, asphalt, asphaltic concrete, concrete, cement, steel, reinforcing steel, iron, or any aggregate materials; the physical properties include moisture content or density; the portable field measurement device is a nuclear density gauge; the nuclear density gauge is positioned and actuated by a remotely operated robotic apparatus; the wireless connection between the controller and the mobile device comprises one or more of: Bluetooth, Wi-Fi, or cellular radio technology; wherein the geolocation sensor comprises a GNSS receiver and antenna; the testing criteria includes criteria for measuring one or more physical properties of the first material; the one or more physical properties includes moisture or density; the one or more processors are further configured to: detect, via a detection sensor, feedback by the portable field measurement device based on actuated one or more keypresses by monitoring any visual or audible feedback emitted by the portable field measurement device; the detection sensor measures the response of a piezoelectric sounder; the first communication interface comprises a direct wired connection; the one or more hardware computer processors are further configured to transmit the test data output from the portable field measurement device to a remote database; the test data transmitted is transmitted via an Internet connection, wherein the Internet connection is mediated by the mobile device or the controller; the controller is further configured to receive GNSS position corrections from a GNSS reference base station or NTRIP caster; the GNSS position corrections are received via one or more radio signals or the Internet; the one or more hardware computer processors are further configured to identify a user based at least in part on information associated with hardware components of the mobile device; the the actuation of one or more keypresses on the keypad of the portable field measurement device is performed by closing analog switches to make contact between one or more rows and one or more columns in the keypad matrix of the portable field measurement device; the actuation of one or more keypresses on the keypad of the portable field measurement device is performed by mimicking the output of a physical keypad via a serial or I$^2$C interface.

One embodiment of a computer-implemented method may comprise: electronically coupling, via a first communication interface, to the portable field measurement device such that the controller and the portable field measurement device electronically communicate, wherein the portable field measurement device is physically positioned to be able to test a first material; coupling, via an attachment mechanism configured to couple to a compatible receiving mechanism on the portable field measurement device, the controller to the portable field measurement device to the receiving mechanism; electronically coupling, via a second communication interface, to a mobile device; storing geolocation data output by a geolocation sensor; accessing, via the mobile device, a test request comprising testing criteria; actuating one or more keypresses on a keypad of the portable field measurement device based at least in part on the test request so that the portable field measurement device runs the testing procedure on the first material; receiving, via the first communication interface, test data from the portable field measurement device; generating and storing, in one or more data storage devices, test results based at least in part on the test data and the geolocation data; generating and transmitting, to the mobile device via second communication interface, instructions for display of the test results on a graphical user interface associated with the mobile device. The computer-implemented method can also include additional configurations, such as: the portable field measurement device is a device for measuring the physical properties of soil, sand, asphalt, asphaltic concrete, concrete, cement, steel, reinforcing steel, iron, or any aggregate materials; the physical properties include moisture content or density; the portable field measurement device is a nuclear density gauge; the nuclear density gauge is positioned and actuated by a remotely operated robotic apparatus; the wireless connection between the controller and the mobile device comprises one or more of: Bluetooth, Wi-Fi, or cellular radio technology; wherein the geolocation sensor comprises a GNSS receiver and antenna; the testing criteria includes criteria for measuring one or more physical properties of the first material; the one or more physical properties includes moisture or density; detecting, via a detection sensor, feedback by the portable field measurement device based on actuated one or more keypresses by monitoring any visual or audible feedback emitted by the portable field measurement device; the detection sensor measures the response of a piezoelectric sounder; the first communication interface comprises a direct wired connection; transmitting the test data output from the portable field measurement device to a remote database; the test data transmitted is transmitted via an Internet connection, wherein the Internet connection is mediated by the mobile device or the controller; the controller is further configured to receive GNSS position corrections from a GNSS reference base station or NTRIP caster; the GNSS position corrections are received via one or more radio signals or the Internet; identifying a user based at least in part on information associated with hardware components of the mobile device; the actuation of one or more keypresses on the keypad of the portable field measurement device is performed by closing analog switches to make contact between one or more rows and one or more columns in the keypad matrix of the portable field measurement device; the actuation of one or more keypresses on the keypad of the portable field measurement device is performed by mimicking the output of a physical keypad via a serial or I$^2$C interface.

DETAILED DESCRIPTION

Overview

Figure 1:
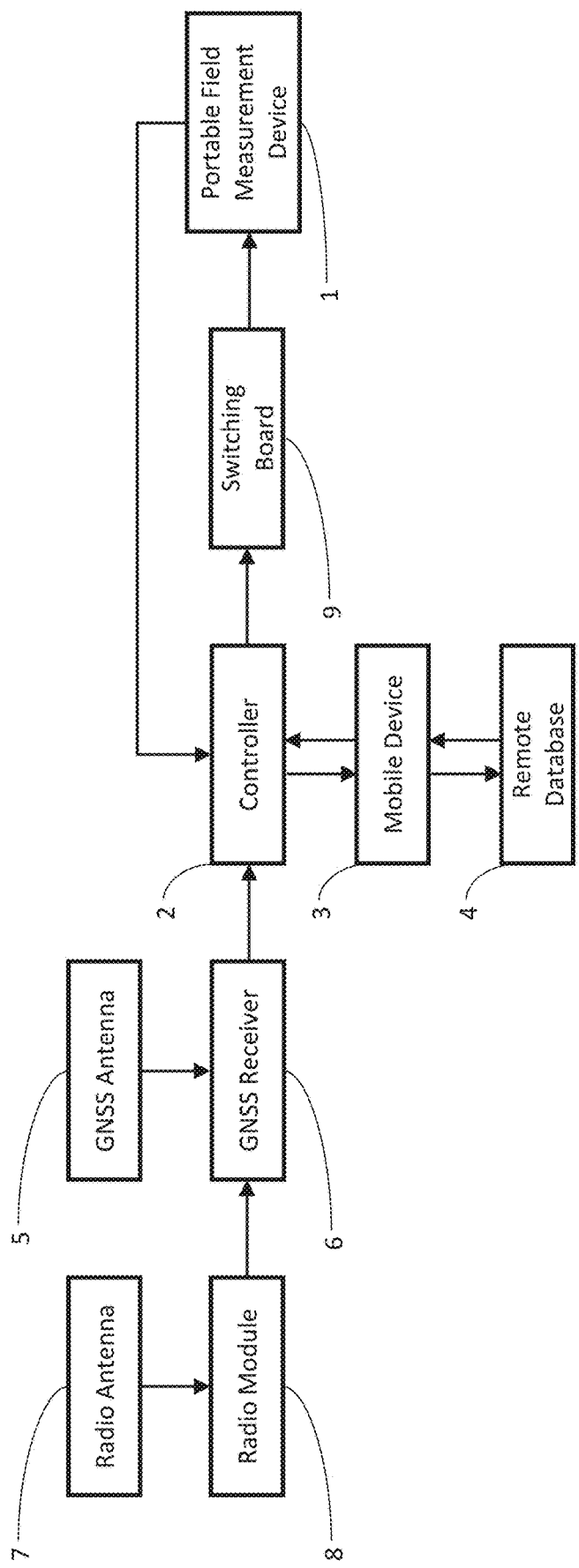
FIG. 1 depicts an example schematic system block diagram, with direction of information flow between blocks shown as connecting arrows.

The systems, methods, and devices described herein each have several aspects, no single one of which is solely responsible for its desirable attributes. Without limiting the scope of this disclosure, several non-limiting features will now be discussed briefly. The present invention disclosure relates to systems and techniques for connecting a device to portable field measurement equipment and the operation of portable field measurement equipment that may be used in construction and civil engineering to measure physical properties of soil and construction materials in situ on a worksite. More specifically, the present disclosure relates to remote operation of a nuclear density gauge through the use of connected device.

As discussed above, acquiring measurements with portable field measurement devices can be a manual process involving manual copying of the output data from the associated display by a user into a word processing software on a computer or handwritten in a notebook, which presents an opportunity for alteration of the output (for example, intentionally to characterize the data in a particular way, or unintentionally by mistake). Also, a user may manually enter test location data based on site plans, which presents opportunity for mistakes in recording the resulting location of the test (for example, intentionally to characterize the data in a particular way, or unintentionally by mistake). In addition, because test result data is frequently stored in a handwritten notebook, manual data entry of the results into an electronic database for storage or further review may present another opportunity for alteration of the data. In some embodiments, manual operation of the portable field measurement device requires physical proximity to the portable field measurement device. Physical proximity can present a potential hazard to safety in that the operator may be forced to operate near heavy construction equipment; beneath overhead hazards; in close proximity to radiation emitted from the portable field measurement device or other sources; and/or in proximity to other hazards.

In some embodiments, manual operation of portable field measurement devices can harm productivity, accuracy, and reliability of test results. A modern instrument might be provided with remote control and remote communication capabilities to address these and the shortcomings described herein. Remote control and remote communication capabilities are not present in portable field measurement devices currently being operated or offered for sale that do not incorporate modern technologies, such as: GNSS, Internet connectivity, portable electronic device interface via Wi-Fi or Bluetooth, electronic input control, and electronic reporting of outputs. The disclosure herein modernizes portable field measurement devices by providing automation, remote control, and remote communication for portable field measurement devices lacking such capabilities.

In some embodiments, the user interface of the portable field measurement device may be presented on a multi-line LCD, or other type of display. For example, confirmation of button presses, current status or operation of the portable field measurement device, and test results may be presented on the display. An automation system could access this information to confirm operations, determine the state of the portable field measurement device, and obtain the results of tests. The automation system could also access the configuration information from the portable field measurement device, such as a serial number associated with the portable field measurement device.

Some portable field measurement devices have a printer output from which a report can be obtained that summarizes the results of a test. Other portable field measurement devices have no such interface, so a different method of obtaining data from such portable field measurement devices is desired. Even portable field measurement devices with printer output often may not provide sufficient information an automation device may desire or require from the portable field measurement device(s). Thus, another technique is desired and is described herein.

In some embodiments, the present disclosure may include a system, which can be wired directly to a portable field measurement device, and can wirelessly communicate with a mobile device (for example, through Bluetooth, Wi-Fi, or Cellular Radio). For example, the system may receive instructions from a user via a mobile device; cause the portable field measurement device to execute the received instructions; electronically process the output of the portable field measurement device; then transmit the processed output to the user via the mobile device (for example, through Bluetooth, Wi-Fi, or Cellular Radio); and, optionally, transmit the output to a remote electronic database.

Additionally, in some embodiments, the present disclosure may incorporate a high-precision GNSS receiver and antenna, which can provide geographic location information to the system which can be associated with the portable field measurement device output. Further, the geographic location information may also be combined with the test data and output to a user or to an electronic database.

In some embodiments, the disclosed device may control the gauge by simulating button presses and detecting the gauge's response by monitoring the visual and audible feedback from the gauge. For example, a piezoelectric sounder that announces the acceptance of a button press or the completion of an operation may be used.

In some embodiments, an efficient interaction with the device is possible if the messages presented to a user on the gauge's display can be read. For example, a typical LCD controller can have a character-based interface. Commands can be sent to the display controller to position a cursor and then to write a character. Many LCD controllers can also support the loading of glyphs to define the symbols to be displayed (for example, by using a 5×7 pixel matrix).

In some embodiments, a display controller can be emulated in software providing a virtual display that can be queried by a user for desired information from a portable field measurement device. For example, such a function can be similar to the screen-scraping techniques performed to extract information from legacy IT systems when web-based applications first appeared.

In some embodiments, because a user can operate a portable field measurement device from a distance (for example, remotely) rather than being physically adjacent to the portable field measurement device to physically push buttons (for example, on an associated panel), the user may be exposed to fewer hazards in the course of operating the portable field measurement device. In some embodiments, these hazards may include an operator being in close proximity to heavy construction equipment, overhead hazards, radiation from the portable field measurement device or other sources, and/or other hazards.

In some embodiments, because data output from a portable field measurement device can be recorded electronically and transmitted to a database for storage, the opportunity for unintentional alteration of the output data is eliminated. Additionally, an audit trail can be created to limit or document intentional alteration of the data output from the portable field measurement device to potentially reduce tampering or fraud.

In some embodiments, because the data output from a portable field measurement device can be associated with GNSS-derived location data, the opportunity for inadvertent or intentional mistakes in recording of the output data may be limited.

Further, as described herein, the system may be configured and/or designed to generate user interface data useable for rendering various user interfaces. The user interface data may be used by the system, and/or another computer system, device, and/or software program (for example, a browser program), to render the user interfaces. The user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of geographical information and may enable a user to more quickly access, navigate, assess, and digest such information than previous systems.

In some embodiments, data may be presented in graphical representations, such as visual representations, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In some embodiments, the systems, methods, and devices of the present disclosure may provide for controlling a portable field measurement device (for example, a nuclear density gauge) with a controller that can connect wirelessly to a mobile device (for example, through Bluetooth, Wi-Fi, or Cellular Radio); receiving user input via the mobile device; causing the portable field measurement device to execute certain actions based on the user input; recording the data output from the portable field measurement device; and displaying the data output on the mobile device.

In some embodiments, the portable field measurement device can be a nuclear density gauge.

In some embodiments, a wireless connection between the controller and the mobile device is mediated via a Wi-Fi hotspot created by the mobile device. In some embodiments, the connection can be mediated by a Wi-Fi hotspot created by the controller; or via Bluetooth connection.

In some embodiments, the user input from the mobile device can be received via web pages on a browser interface on a user's mobile device, for example by a web server residing on the controller accessed by the mobile device. In some embodiments, the user input can be captured by an application installed on the mobile device.

In some embodiments, the controller can send instructions to the portable field measurement device to execute actions and commands requested by a user through manually actuating one or more keypresses on a keypad connected to the portable field measurement device. For example, the keypad may operate by closing analog switches to make contact between one or more row and one or more column in the keypad matrix of the portable field measurement device. In some embodiments, the controller can send instructions to the portable field measurement device to execute actions and commands requested by a user by simulating electrical effects of capacitive buttons, or through mimicking the output of a physical keypad via serial, I2C, or other interface.

Detailed Examples

Turning now to FIG. 1, FIG. 1 depicts an example of a schematic system block diagram, with direction of information flow between blocks shown as connecting arrows. The portable field measurement device 1 is operated by an electronic controller 2 which is connected to a mobile device 3 (for example, through Bluetooth, Wi-Fi, or Cellular Radio). In some embodiments, the mobile device 3 communicates with a database 4 (for example, a remote database) to receive project data and/or parameters pertaining to the testing to be conducted, and to transmit the results of completed tests for electronic storage and further analysis, for example to the database 4. In some embodiments, the test data can be associated with a location in geographic coordinates and time, which can be obtained via a GNSS antenna 5 connected to a GNSS receiver 6, which can stream position and time data into the controller 2. The GNSS-derived location is further refined within the GNSS receiver 6 by the application of a local correction signal over radio frequencies through a radio antenna 7 cabled to a radio module 8; or over public Internet connection to a Networked Transport of RTCM via Internet Protocol (NTRIP) server, either directly via a cellular modem connection, or through the mobile data connection of the mobile device 3. In some embodiments, the mobile device 3 can send instruction to the controller 2 to initiate operation of the portable field measurement device 1, the controller 2 can actuate the portable field measurement device 1 by means of an analog switching board 9 which simulates keypresses on the keypad of the portable field measurement device 1. The output of the portable field measurement device 1 is then recorded by the controller 2 which can then be transmitted via the mobile device 3 to the remote database 4 for storage and further analysis.

In some embodiments, the controller can record data output from the portable field measurement device via a subsystem which can record or interpret the signals from a display controller of the portable field measurement device. This subsystem can include:

1. A hardware interface that can monitor the control and data signals to the display controller;

2. A display controller emulator implemented in software; and

3. Screen interpretation software that extracts necessary information from the virtual display.

In some embodiments, the hardware interface may be configured to receive control and data signals from the portable field measurement device. However, the connection and interface specifics may vary from one controller to the next. As an example, an Optrex controller can be used. The Optrex controller has a data bus that is either 4 or 8 bits wide. It has three control signals: select, enable, and R/W. In this disclosure, these signals are connected to the inputs of a processor that can capture the transitions on these lines. The processor should be fast enough and configured to emulate the display in real time. The display controller signals can be connected to the processor via the processor's general-purpose input/output (GPIO) pins. The processor can configure interrupts for transitions on these signals. Such interrupts can be assigned to the control signals since the data bus is static when the enable or select control signals change (due to setup time requirements of the display controller). A typical LCD operation may take 40 microseconds. If the speed of the interface to the display controller is too fast for the processor to keep up, a first in, first out (FIFO) implementation can be used to capture signal and data transitions to avoid the loss of data. For example, a FIFO implementation can be implemented in hardware or software.

In some embodiments, the LCD emulator can implement the commands supported by the display controller. Using the Optrex LCD again as an example, the commands can be programmed as follows. It should be appreciated that commands can be programmed different and fewer or more commands can be programmed as well.

clear display
home cursor
set entry mode
display on/off
cursor on/off
function set
set DDRAM address (data display RAM)
set CGRAM address (character glyph RAM)
Read busy flag
Write data to DDRAM or CGRAM
Read data from DDRAM or CGRAM In some embodiments, the function set can be a 4/8 bit bus. In some embodiments, one or more of the following commands are not required to operate the device: display on/off, cursor on/off, and Read data from DDRAM or CGRAM. These exemplary commands are captured by the emulator and emulated to modify a virtual LCD screen. For example, a LCD screen may have 2 16-character lines for a total of 32 characters. A typical sequence may involve setting a display address (DDRAM) and writing characters. Also, one design issue can be determining when the LCD screen update is complete, which can be performed by a screen interpreter described in more detail herein.

In some embodiments, reading and interpreting a virtual display can be performed by screen-scraping and emulating the operational state of a portable field measurement device. For example, for any state of the portable field measurement device, and a given command sequence, the system can determine what data changes on the display and detect when the changes occur and when the change is complete. In some embodiments, it is also possible to obtain feedback from the audio annunciator (for example, a piezo alarm) present in many models of portable field measurement devices. In some embodiments, the contents of the screen can be interpreted to extract necessary information used by this invention. For example, a model of the operation of the portable field measurement device is desired, and variations from a first version of portable field measurement device firmware to a second version of device firmware is desired, and these variations can be determined by a screen-scraper by interpreting the display appropriately.

In some embodiments, the controller can record result data output from the portable field measurement device based on any tests run by further sending instructions to the portable field measurement device to print a report, and by receiving and recording the resulting serial signal from one or more leads of a serial or printer port of the portable field measurement device. In some embodiments, the report can be read via a Bluetooth or other wireless interface.

In some embodiments, the device can be housed in an environmental enclosure (for example, a Bud Box) which can be attached to the portable field measurement device via an external mounting plate which can then be mounted to the enclosure of the portable field measurement device. In some embodiments, the device can be attached and detached from the mounting plate with or without the use of tools. In some embodiments, the electronic connections between the system and the portable field measurement device are routed through a single port mounted to the enclosure of the portable field measurement device. In some embodiments, the device can be mounted to the portable field measurement device such that tools are required to remove it; or the system is mounted and contained entirely within the enclosure of the portable field measurement device.

In some embodiments, the device may include one or more of the following features.

For example, in some embodiments, the controller can be further configured to transmit data output from the portable field measurement device to a remote database via a private network or public Internet connection. In some embodiments, the connection can be mediated by a mobile device. In some embodiments, the connection can be mediated directly by the controller itself.

In some embodiments, the system can further incorporate a GNSS receiver to provide geographic location information that can be associated with output from the portable field measurement device. In some embodiments, the GNSS receiver can receive real-time kinematic (RTK) position corrections over UHF radio from a base station at a surveyed location. In some embodiments, the GNSS receiver can receive RTK position corrections via an Internet connection (for example, NTRIP servers); via the Wide Area Augmentation System (WAAS); or the data can remain uncorrected and no RTK position correction data can be received.

In some embodiments, the controller can be further configured to identify a user of the system from properties of the mobile device. For example, the identity of the user can be matched to a network service set identifier (SSID) of a WiFi hotspot created by the mobile device. In some embodiments, the identity of a user may be matched to the hardware identity of an associated mobile device, for example the MAC address or serial number of the mobile device; or the identity of a user may be provided by an application into which the user's identity has been entered, the application may be installed or otherwise available on the mobile device.

In some embodiments, the controller can be further configured to detect a confirmation signal from the portable field measurement device that a keypress, completion of an action, or other event has occurred. In some embodiments, the detection can occur by means of measuring the current in a circuit that can control a buzzer or beeper connected to the portable field measurement device. In some embodiments, the detection can occur by means of a microphone in the controller which can detect an audible tone from the portable field measurement device; or by means of recording or interpreting signals from a display controller of the portable field measurement device.

In some embodiments, the system can further be powered by a battery. In some embodiments, the battery can be contained within the same enclosure as the controller, and the battery can be dedicated to powering the system as the sole power source. In some embodiments, other power sources can be used. For example, multiple batteries (including internal to the enclosure or external) and/or plugging the system into a generator or electrical grid. In some embodiments, the battery can be charged through a USB port while remaining in the enclosure, which can also function as a serial interface to the controller for software configuration and low-level access. In some embodiments, the battery can be contained within the portable field measurement device housing; the battery can be the same battery which powers the portable field measurement device; and in some cases the battery may be charged through the same charging port as the portable field measurement device. In some embodiments, the battery can be removed from the device or the portable field measurement device to be charged or replaced with a new battery.

Figure 2:
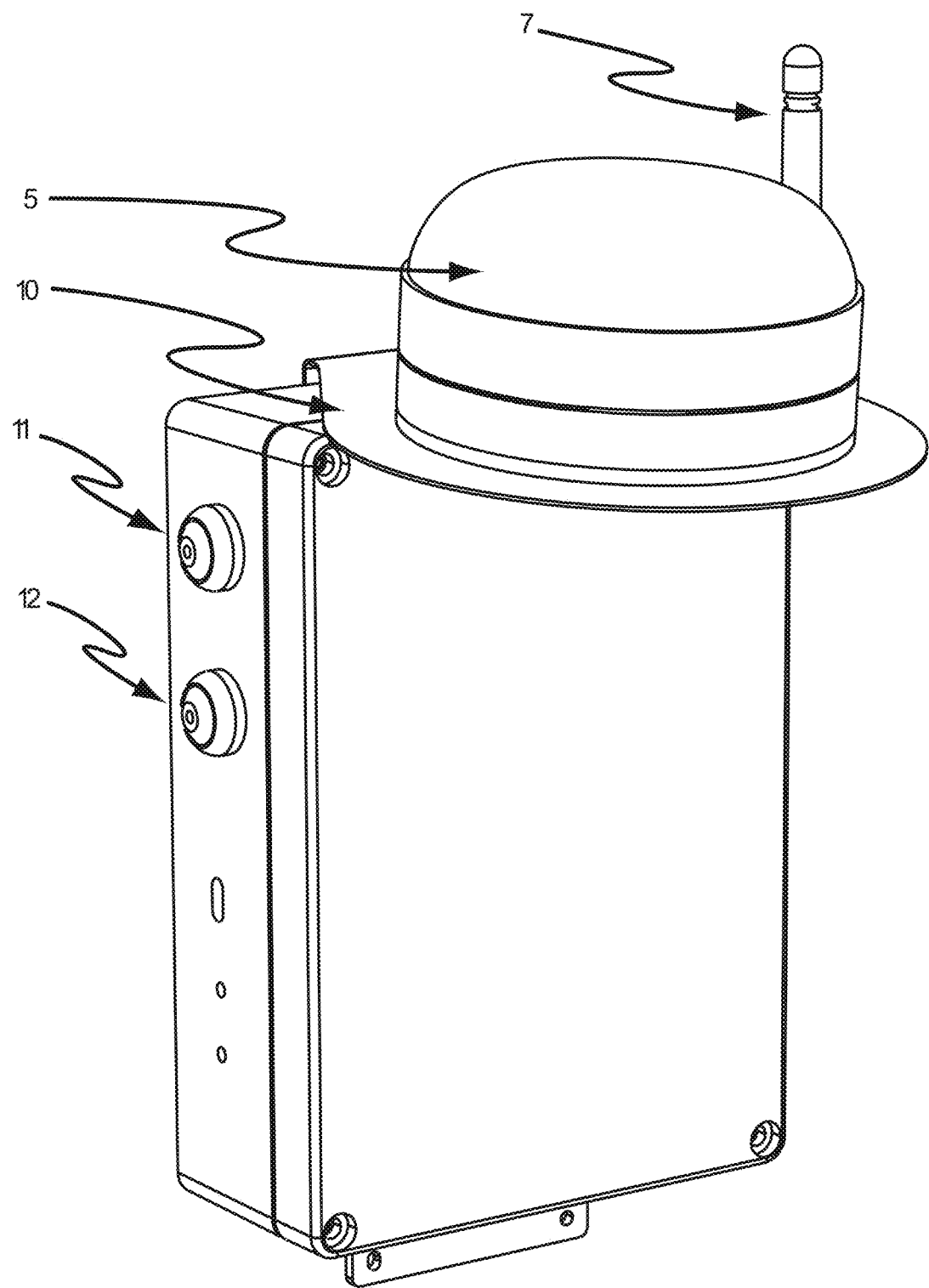
FIG. 2 illustrates a front, left side perspective view of a prototypical system.

FIGS. 2-7 illustrate various embodiments of the device, its components, and how the device can be connected to a portable field measurement devices. With respect to FIG. 2, FIG. 2 illustrates the front of an example prototypical system. The GNSS antenna 5 can be attached to a metallic ground plane 10. Also illustrated are a radio antenna 7, a power-on-off button 11 (which, in some embodiments, can be used to reset the device), and a network reset button 12. In some embodiments, the network reset button, in the event that the WiFi connection between the controller and the mobile device becomes inoperative for any reason, can be used to reset the connection during troubleshooting. For example, actuating the button can disable and then re-enable the WiFi adapter on the controller without requiring the user to wait for a full power cycle of the complete system.

Figure 3:
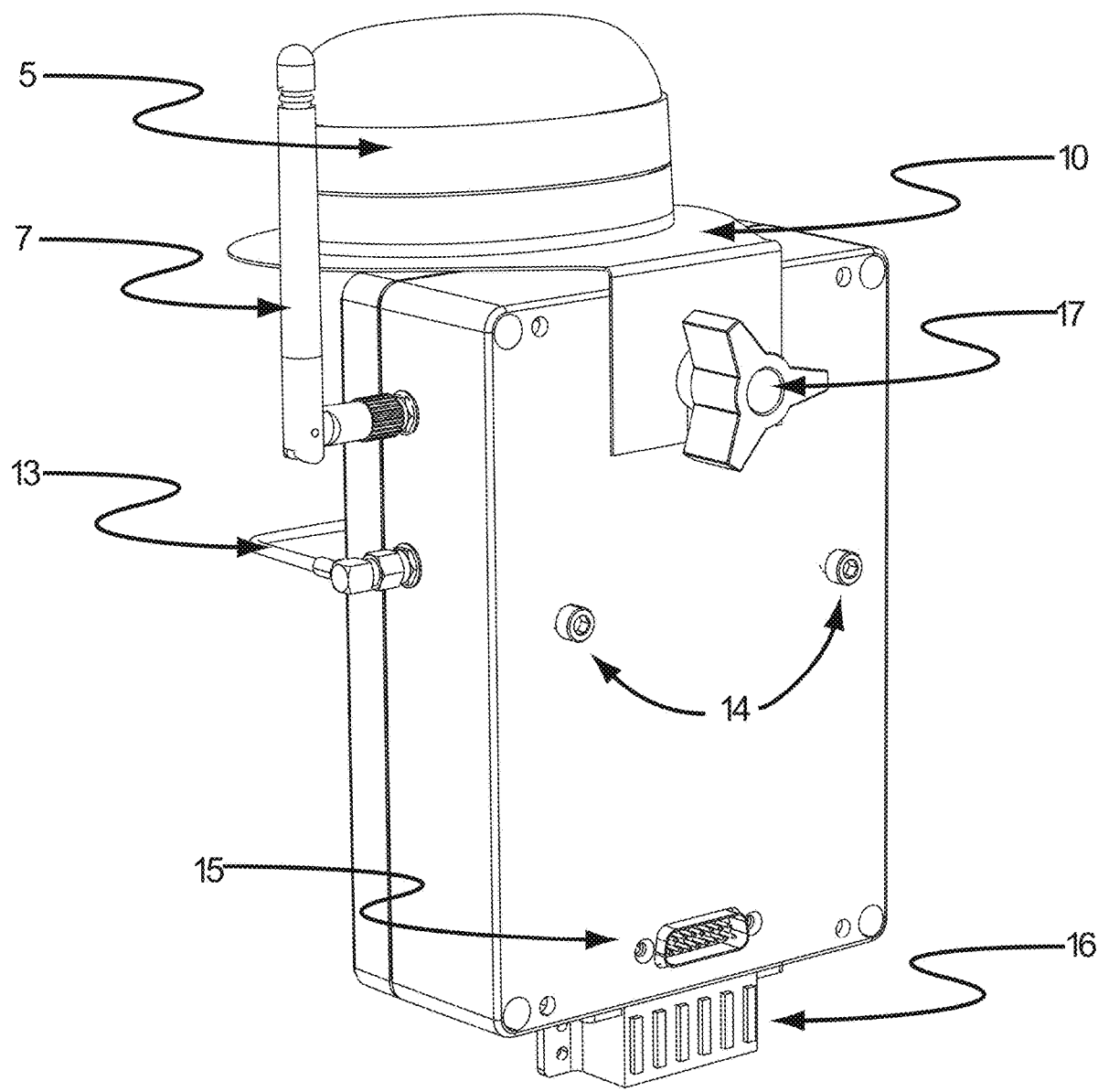
FIG. 3 illustrates a rear, right side perspective view of the prototypical system of FIG. 2.
Figure 6C:
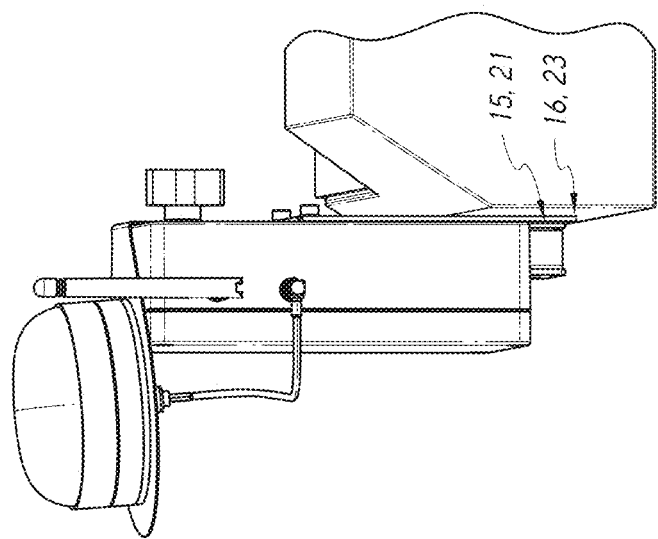
FIGS. 6(a), 6(b), and 6(c) illustrate the procedure for mounting the system as shown in FIG. 2 to the portable field measurement device as shown in FIG. 5.
Figure 6B:
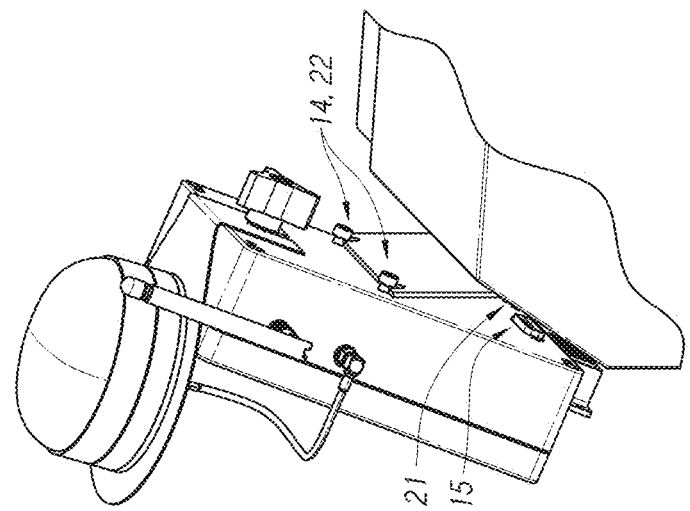
Figure 6A:
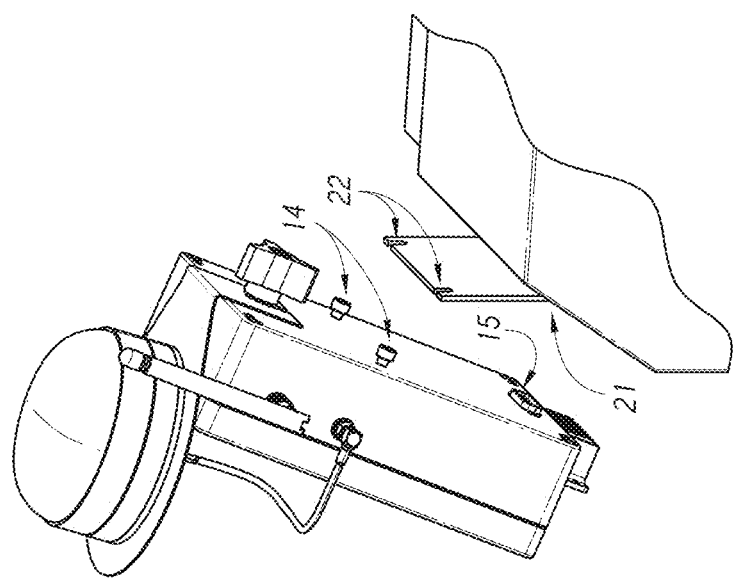

FIG. 3 illustrates the rear of the example prototypical system of FIG. 2. A radio antenna 7 is shown in FIG. 3. Also, a GNSS antenna 5 is shown and can be attached to a metallic ground plane 10, similar to FIG. 2. The GNSS antenna cable 13 can be disconnected from the enclosure, and the ground plane 10 and GNSS antenna 5 can be removed from the enclosure via a ground plane attachment knob 17. Being able to remove such components allows the device to be stored in a smaller case than would otherwise be possible, as well as prevent damage to the sensitive components and connections while being transported. The device can connect to a portable field measurement device by means of a DB15 male connector 15 for example, and can be retained against the portable field measurement device by means of two socket head cap screws 14 that can slot into a mounting plate on the portable field measurement device, as shown in FIGS. 6(a), 6(b), and 6(c), and by a natural magnet 16 that latches onto a ferromagnetic latch on the mounting plate, as shown in FIGS. 6(a), 6(b), and 6(c).

Figure 4:
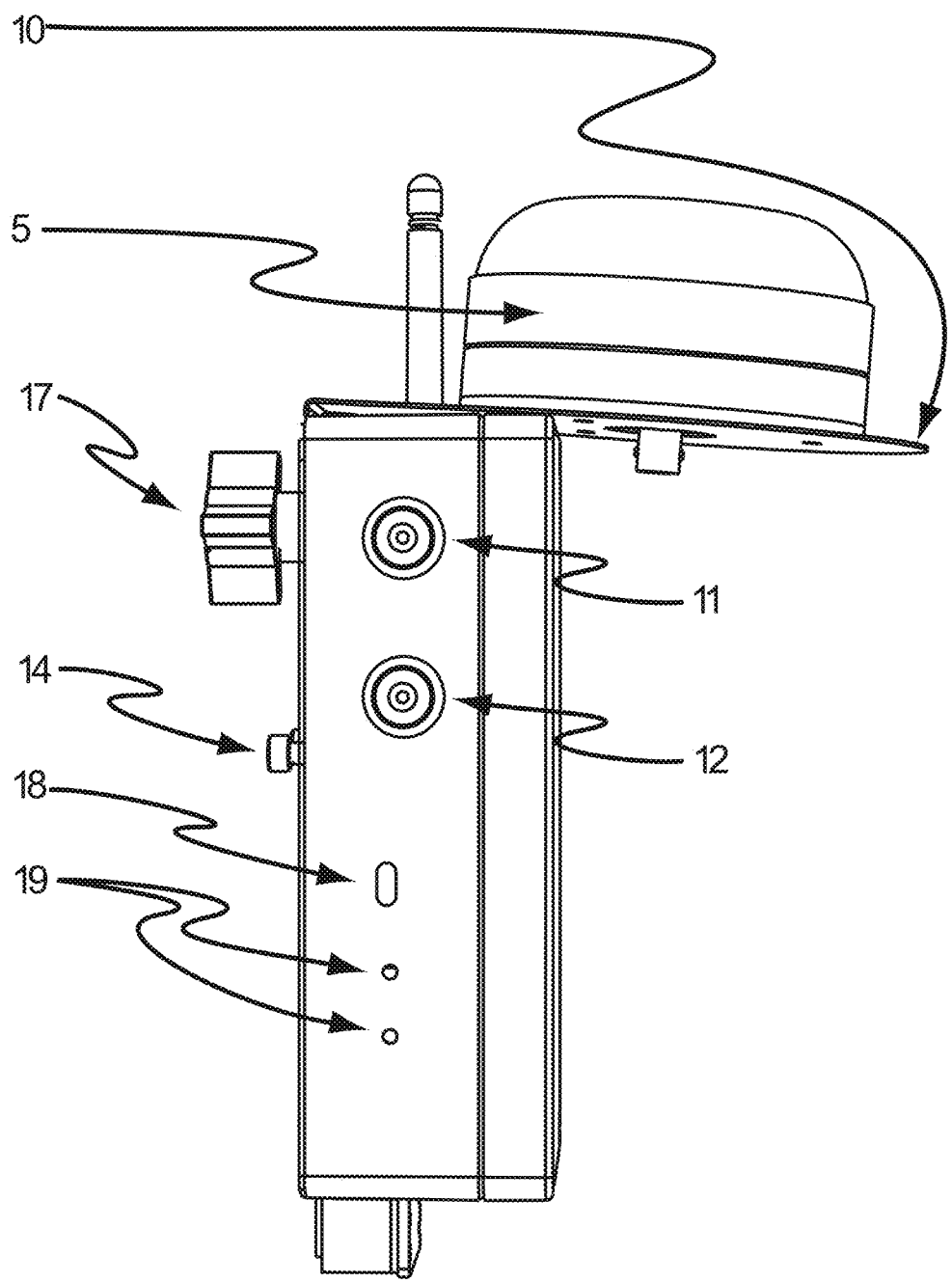
FIG. 4 illustrates a left side view of the prototypical system of FIG. 2.

With respect to FIG. 4, FIG. 4 illustrates a side view of the example prototypical system of FIG. 2. The GNSS antenna 5 can be attached to a metallic ground plane 10, similar to FIG. 2. Also illustrated are the power-on-off button 11 and the network reset button 12 as illustrated in FIG. 2; the ground plane attachment knob 17 and one socket head cap screw 14 as illustrated in FIG. 3; the charging/programming Micro-USB port 15, and two status LEDs 19. The Micro-USB port 18 can provide two or more features. For example, one feature provided is that the port can be connected to a DC USB power supply to charge an internal battery inside the enclosure. Another feature is that the port can be plugged into a USB port on a computer and act as a serial connection to the controller PC board inside the enclosure, for low-level programming access, for example. It should be appreciated that other connections and features are available to a person of skill in the art based on compatibility to the USB standard, or other standard used by the available port(s). The status LEDs 19 can be used to indicate power state, operational mode and health of the system to the user, among other functions. Other LED status light indicators can also be included in the device. It should be also appreciated that the Micro-USB port 18 can be any interface that allows a connection to a mobile electronic device and computer, such as a lightning port for an iPhone or a USB C port for a computer, android-based phone, or tablet, for example. In some embodiments, the USB port can be replaced by any other electrical connector when communication with the controller is not needed, or can be accomplished wirelessly.

Figure 5:
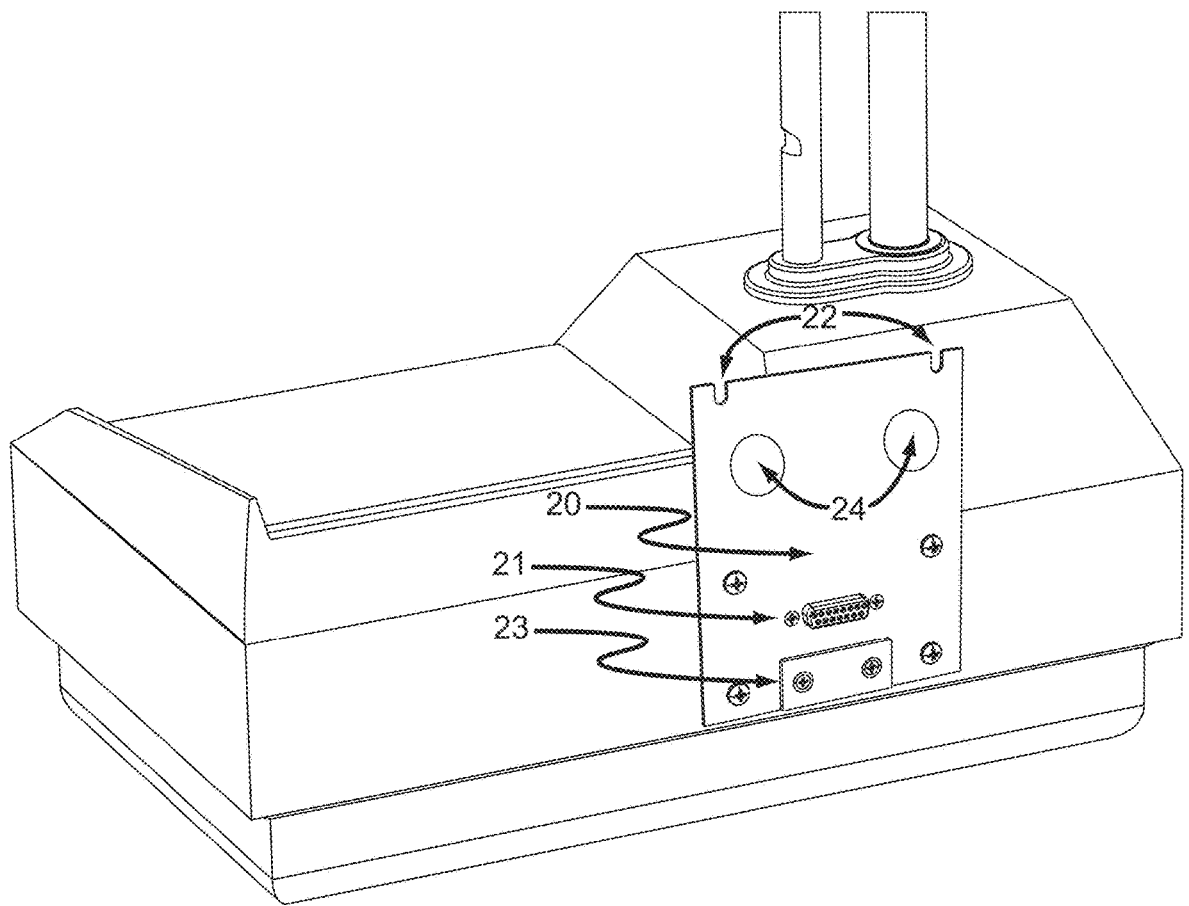
FIG. 5 illustrates a mounting plate connected to the top shell of a typical portable field measurement device, for example a nuclear density gauge.

FIG. 5 illustrates an example mounting plate 20 connected to the top shell of a typical portable field measurement device. The system shown in FIGS. 2-4 can mount to the illustrated plate by means of slotting the socket head cap screws (as shown in FIG. 3) into the receiving slots 22. The natural magnet (as shown in FIG. 3) can then be mated to the ferromagnetic latch 23, causing the DB15 male connector (as shown in FIG. 3) to mate into the DB15 female connector 21 on the mounting plate, completing the electronic connection between the controller and the portable field measurement device. In some embodiments, proper spacing between the system and the mounting plate can be maintained near the receiving slots 22 by means of a pair of foam rubber spacing pads 24 near the top of the mounting plate. In some embodiments, the foam rubber spacing pads 24 can be used to ensure a snug fit that doesn't rattle and accommodates wear or variations in the heights of the cap screws. For example, the foam rubber spacing pads 24 can also allow for the spacing needed so the portable field measurement device can be tilted off the DB15 when attaching or detaching it from the gauge. In some embodiments, for example, when the portable field measurement device is a nuclear density gauge, the mounting plate can be designed and attached to the nuclear density gauge such that the combination of the nuclear density gauge and mounting plate can fit into the nuclear density gauge's existing transportation case without modification. This is desired because the transportation case of a nuclear density gauge is certified according to Nuclear Regulatory Commission rules and cannot be modified without requiring recertification. The transportation case is designed and certified to minimize the likelihood of inadvertent release of radioactive material from the case during transit.

FIGS. 6(*a*), 6(*b*), and 6(*c*) illustrate an example procedure for mounting the device as shown in FIG. 2 to the portable field measurement device as shown in FIG. 5. With respect to FIG. 6(*a*), a user can align the socket head cap screws 14 with the receiving slots 22 and lower the screws into the slots with the enclosure angled away from the portable field measurement device. The slots and screws can be positioned such that the DB15 male 15 and female 21 connectors are aligned. With respect to FIG. 6(*b*), a user can rotate the bottom of the enclosure toward the portable field measurement device, engaging the natural magnet 16 to the ferromagnetic latch 23. This can mate the DB15 male 15 and female 21 connectors, completing the electronic connection between the controller and the portable field measurement device. FIG. 6(*c*) illustrates the device mounted to the portable field measurement device, such that the DB15 male 15 and female 21 connectors are mated and the natural magnet 16 is engaged to the ferromagnetic latch 23.

Figure 7C:
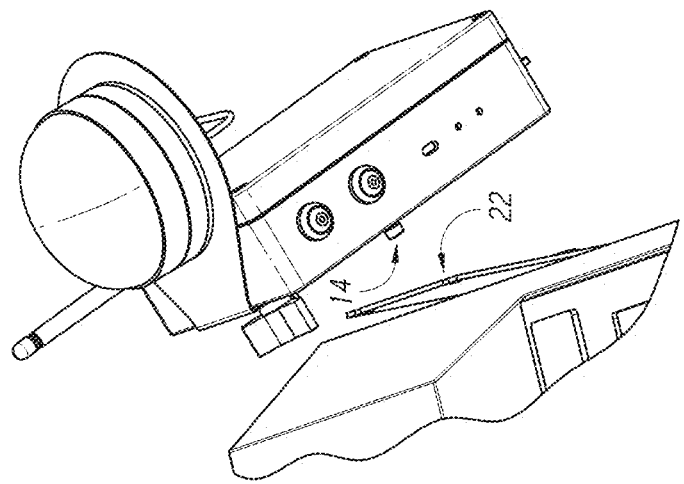
FIGS. 7(a), 7(b), and 7(c) illustrate the procedure for detaching the device as shown in FIG. 2 from the portable field measurement device as shown in FIG. 5.
Figure 7B:
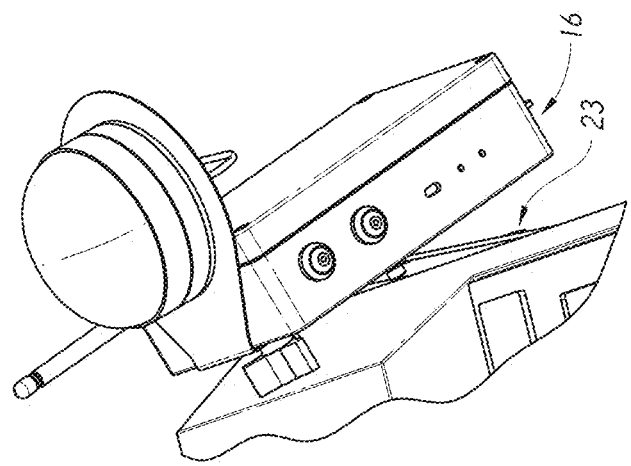
Figure 7A:
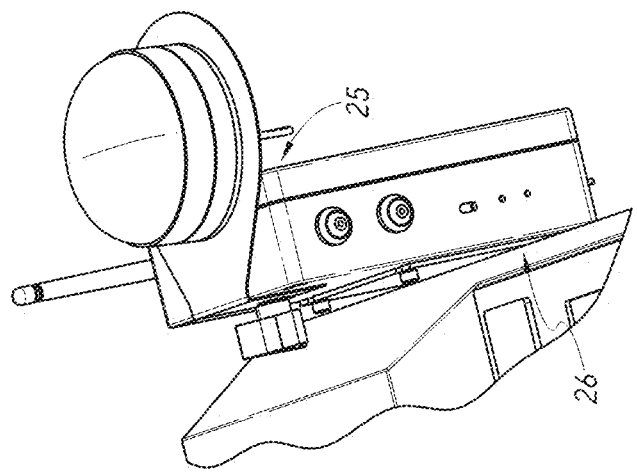

FIGS. 7(*a*), 7(*b*) and 7(*c*) illustrate the procedure for detaching the system as shown in FIG. 2 from the portable field measurement device as shown in FIG. 5. With respect to FIG. 7(*a*), a user can grip the enclosure from both sides with thumbs at the upper corners on the front of the enclosure 25 as shown for example, and other fingers at the lower corners on the back of the enclosure 26, also as shown. With respect to FIG. 7(*b*), a user can then rotate the bottom of the enclosure away from the portable field measurement device, disengaging the ferromagnetic latch 23 from the natural magnet 16. With respect to FIG. 7(*c*), the user can then lift the device up to clear the socket head cap screws 14 of the receiving slots 22.

FIGS. 8-14 illustrate example user interfaces to be used in connection with the device. It should be appreciated that other user interfaces can be used to operate the device and interact with the data sent to and received from the device.

Figure 8:
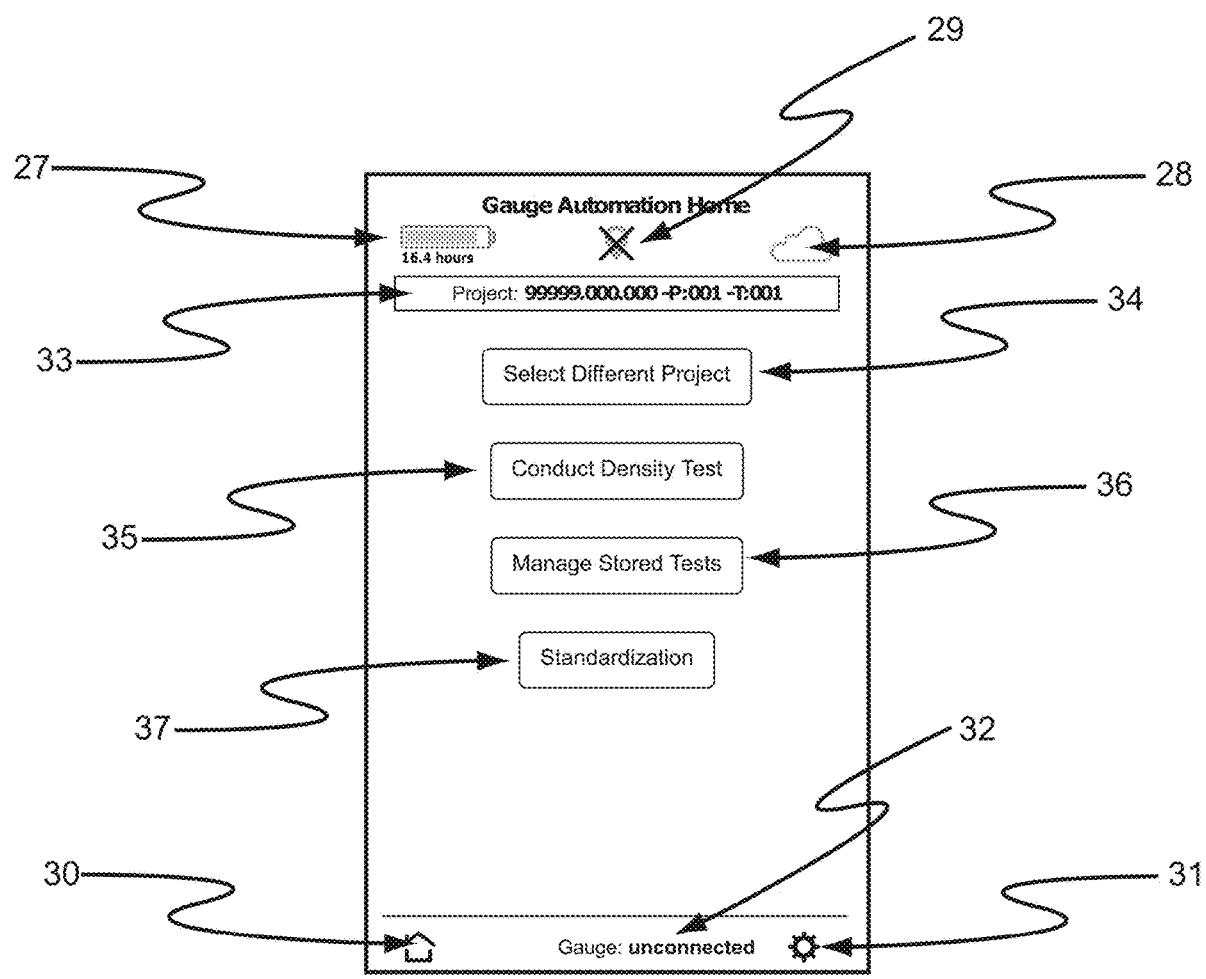
FIG. 8 shows an example home screen user interface for the software used by a mobile device to interact with a controller.
Figure 9:
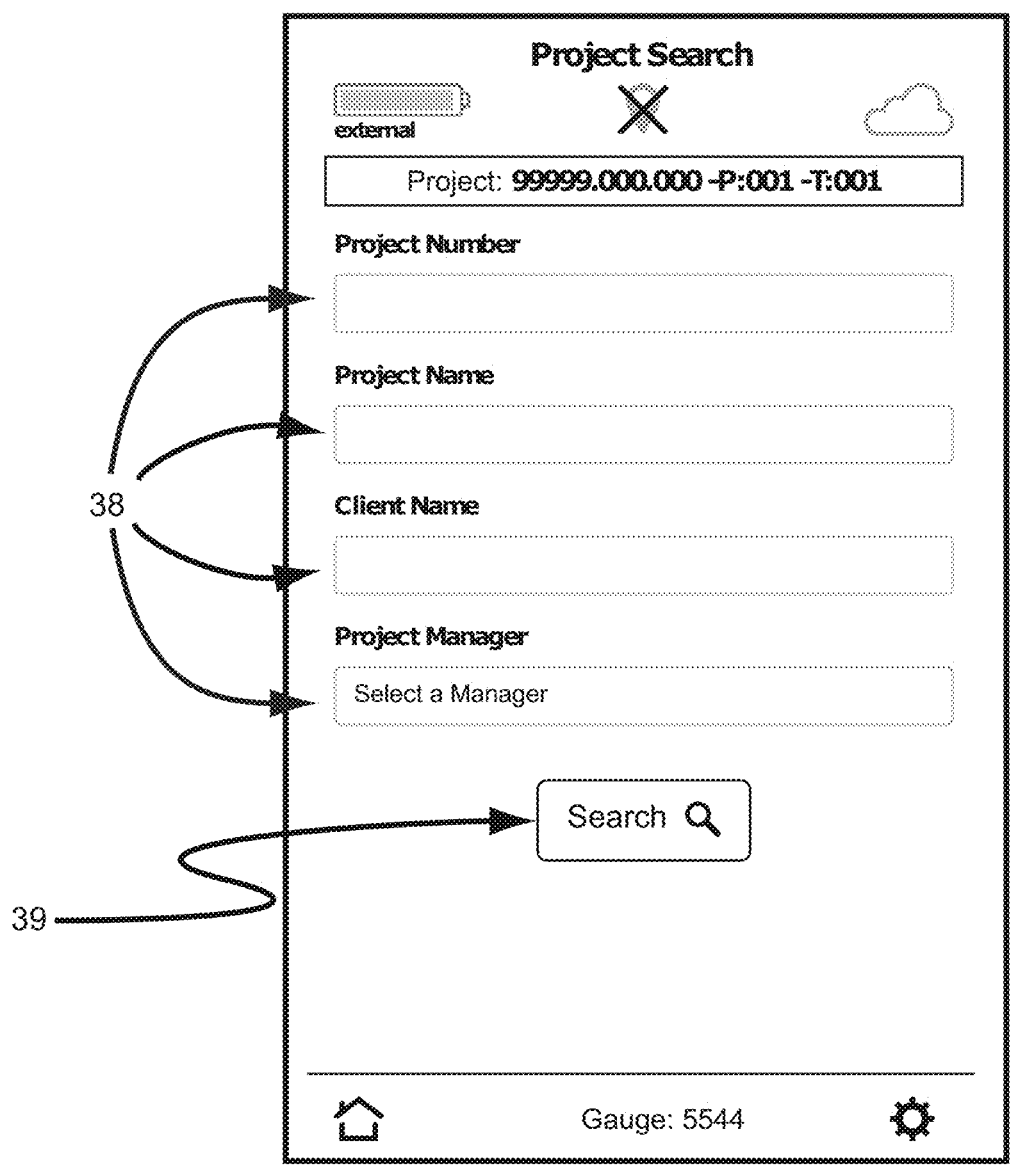
FIG. 9 shows an example project search screen user interface for the software used by the mobile device to interact with a controller.
Figure 10:
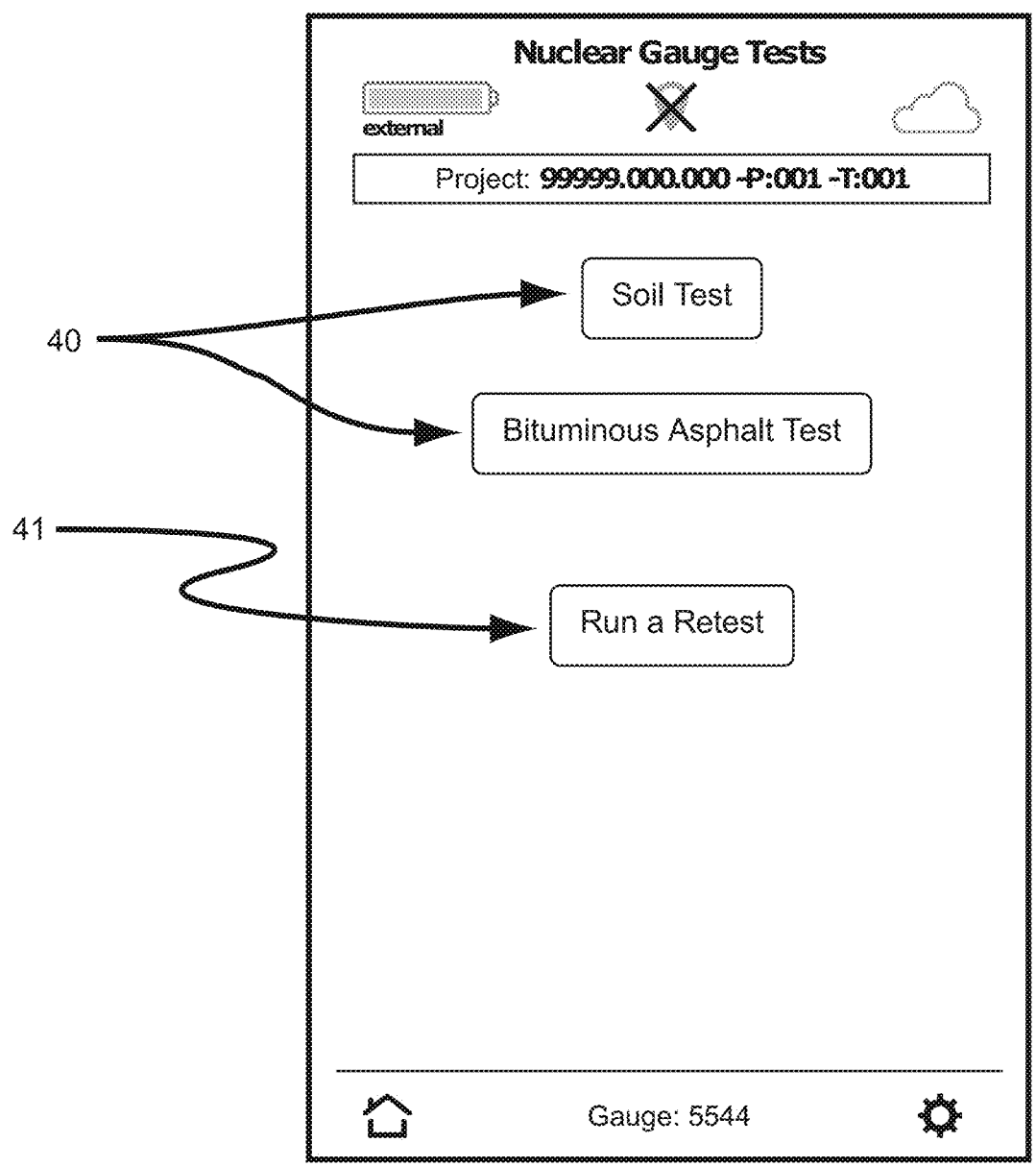
FIG. 10 shows an example main testing screen user interface for the software used by the mobile device to interact with a controller.
Figure 12:
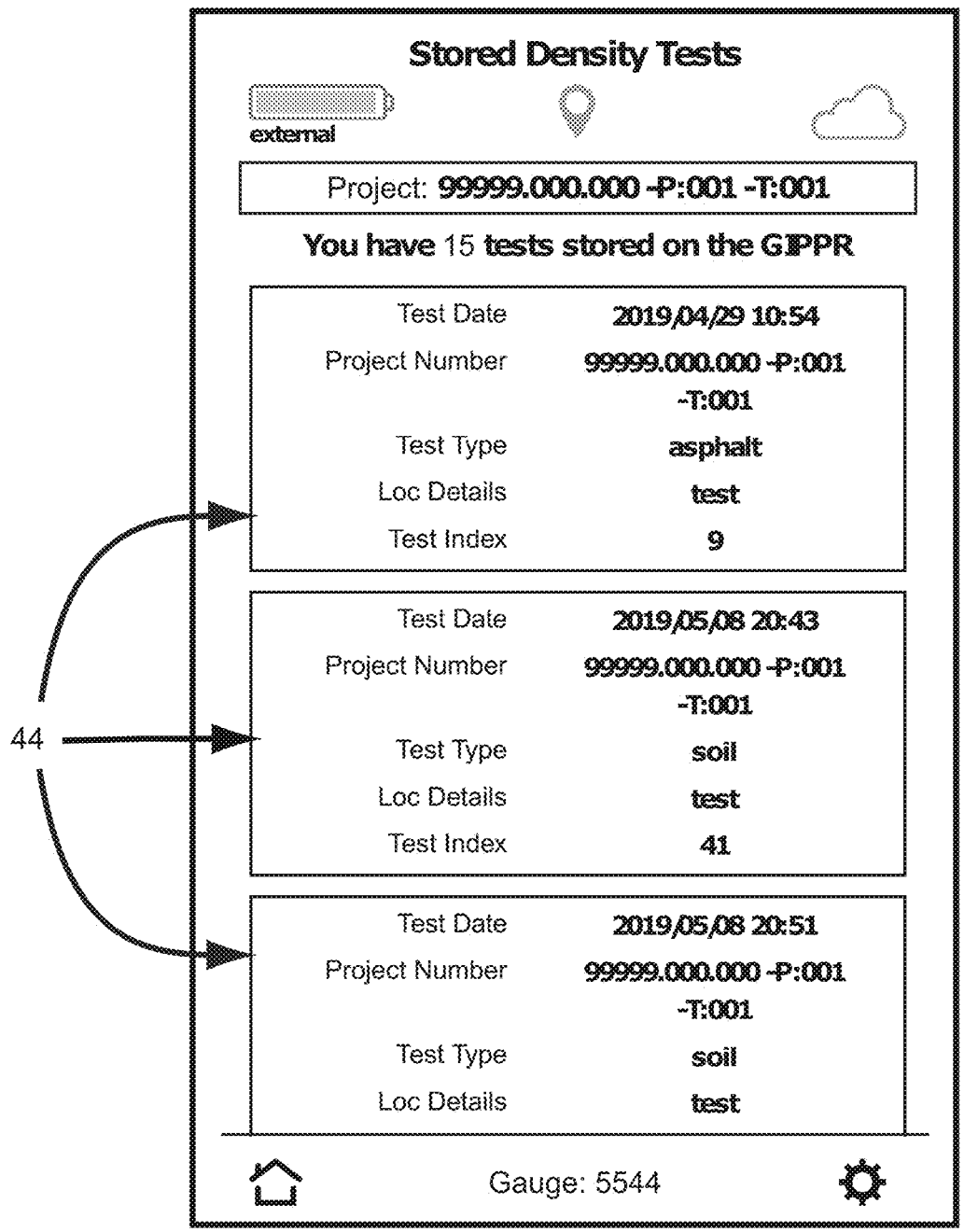
FIG. 12 shows an example stored test screen user interface for the software used by the mobile device to interact with a controller.

FIG. 8 shows an example home screen user interface for the software used by a mobile device to interact with a controller. The software can present a user interface display showing battery charge state and remaining lifetime 27, and indicator lights showing network and database connection state 28, and GNSS location quality and state 29. The GNSS location quality and state indicator 29 can change appearance to indicate, for example, whether vertical and horizontal quality is sufficient, whether only horizontal quality is sufficient, or whether the GNSS location quality is insufficient in both horizontal and vertical dimensions. In some embodiments, the GNSS location quality and state indicator light 29 can be separated into two separate indicators that show GNSS location state and location quality respectively. In some embodiments, the software can also present a "home" button 30 to return the user to the home screen, a settings button 31 to give the user access to a variety of system parameters and settings, and a portable field measurement device connection state display 32 showing whether the controller detects a good electrical connection with the portable field measurement device. In some embodiments, the main page can also display the status of project data for the currently selected project 33, as well as buttons to select a different project 34, conduct a test 35, and manage tests that are stored on the system but not yet synced to the online database 36. Other functions of the portable field measurement device can be represented on this display, for example, a button to perform a standardization function of the portable field measurement device 37. In some embodiments, the project name can be assigned a nickname. When the user selects the button to select a different project 34, the interface changes to the project search screen as shown in FIG. 9. When the user selects the button to conduct a density test 35, the interface changes to the main testing screen as shown in FIG. 10. When the user selects the button to manage stored tests 36, the interface updates to the stored tests screen as shown in FIG. 12. When the user selects the home button 30, the interface changes to the home screen as shown in this figure.

FIG. 9 shows an example project search screen user interface for the software used by the mobile device to interact with a controller. In addition to the features called out in FIG. 8, the project search screen user interface can allow a user to enter various search terms relevant to the desired project 38, and press the search button 39 to poll the online database for matching projects. The active project can then be selected from the search results, and its project data can be synced from the online database to the controller as required, for example. When the project has been selected and any project data are appropriately synced from the online database, the interface returns to the home screen as shown in FIG. 8, and subsequent interactions by the user with the interface will act upon the selected project.

Figure 11:
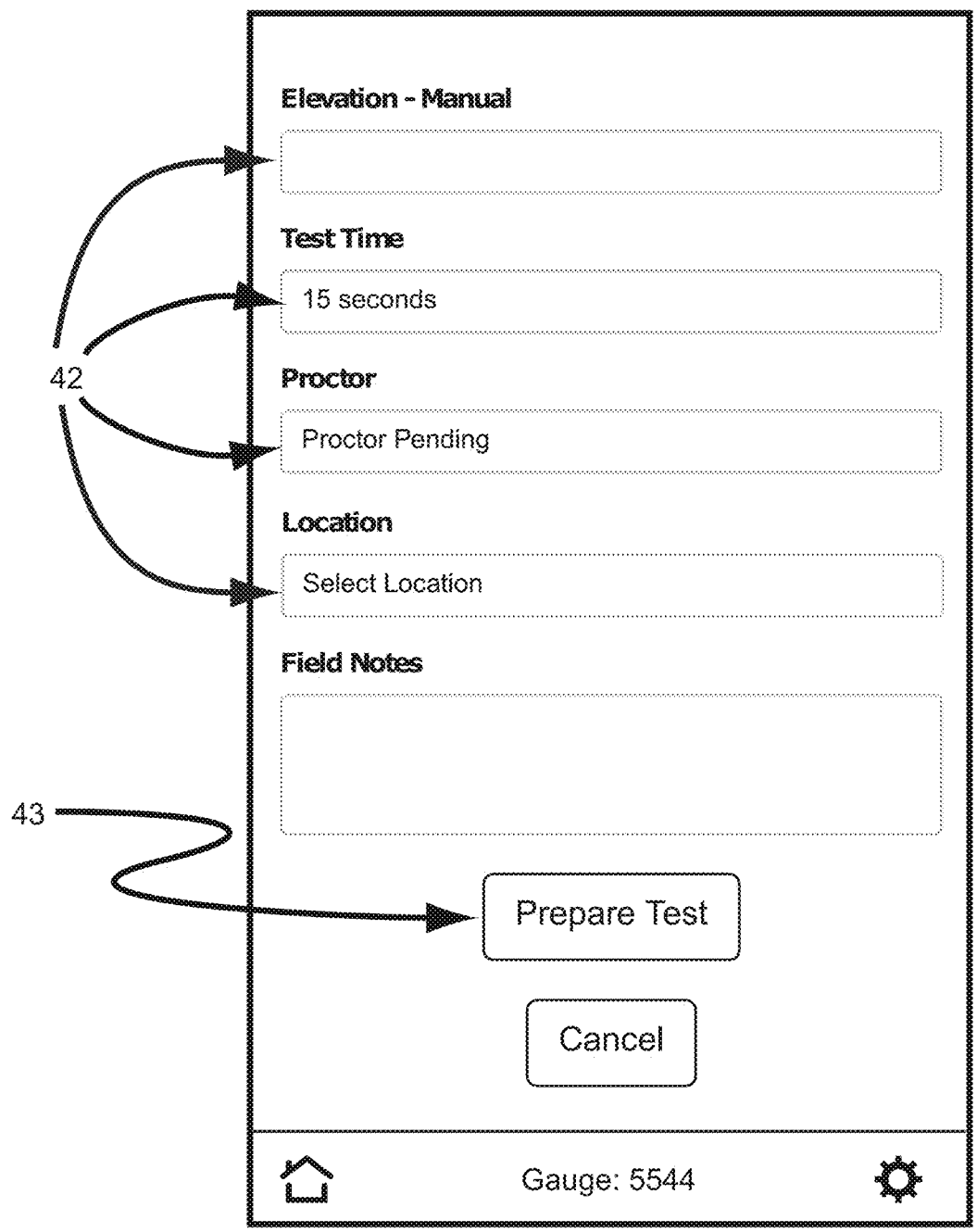
FIG. 11 shows an example test data entry screen user interface for the software used by the mobile device to interact with a controller.

FIG. 10 shows an example main testing screen user interface for the software used by the mobile device to interact with a controller. In addition to the features called out in FIG. 8, the main testing user interface screen can have buttons allowing a user to create, for example, a new soil or bituminous asphalt test 40, or re-run a prior test 41. In some embodiments, the main testing user interface screen can have a button to select a pending test, in cases when a prior test was missing data and that data can subsequently be entered. In some embodiments, one or more buttons can be greyed out or not selectable based on what testing or options are available to the user. Such determinations of available testing can be based in part on the portable field measurement device or particular hardware limitations of the device disclosed herein, the portable field measurement device, the connection to the mobile device, or the like. When the user selects one or more buttons to create a new test 40, the interface changes to the test data entry screen as shown in FIG. 11. When the user selects the button to run a retest 41, the interface changes to the test data entry screen as shown in FIG. 11, except that the user may be presented with a selection of tests which may be retested, and upon selection of one of these tests, one or more of the parameter fields 42 may be pre-populated with test data from the selected test, and one or more of the parameter fields 42 may be locked to prevent alteration of test parameters for the retest. In some embodiments, when the user selects a test for retesting, the interface displays a compass or other representation to guide the user to the location of the selected test based on the recorded location of the selected test and the current position of the device as determined by the GNSS receiver. In some embodiments, the user may only be permitted to execute a retest when within a pre-defined distance of the selected test. In some embodiments the user may be permitted to perform a retest at any location, or, if the device is unable to determine its location, at any location. In an alternative embodiment, when the user select a button to select a pending test, the interface may change to the test data entry screen as shown in FIG. 11, except that the user may be presented with a selection of pending tests, and upon selection of one of these tests, one or more of the parameter fields 42 may be pre-populated with test data from the selected test, and one or more of the parameter fields 42 may be locked to prevent alteration of test parameters.

Figure 13:
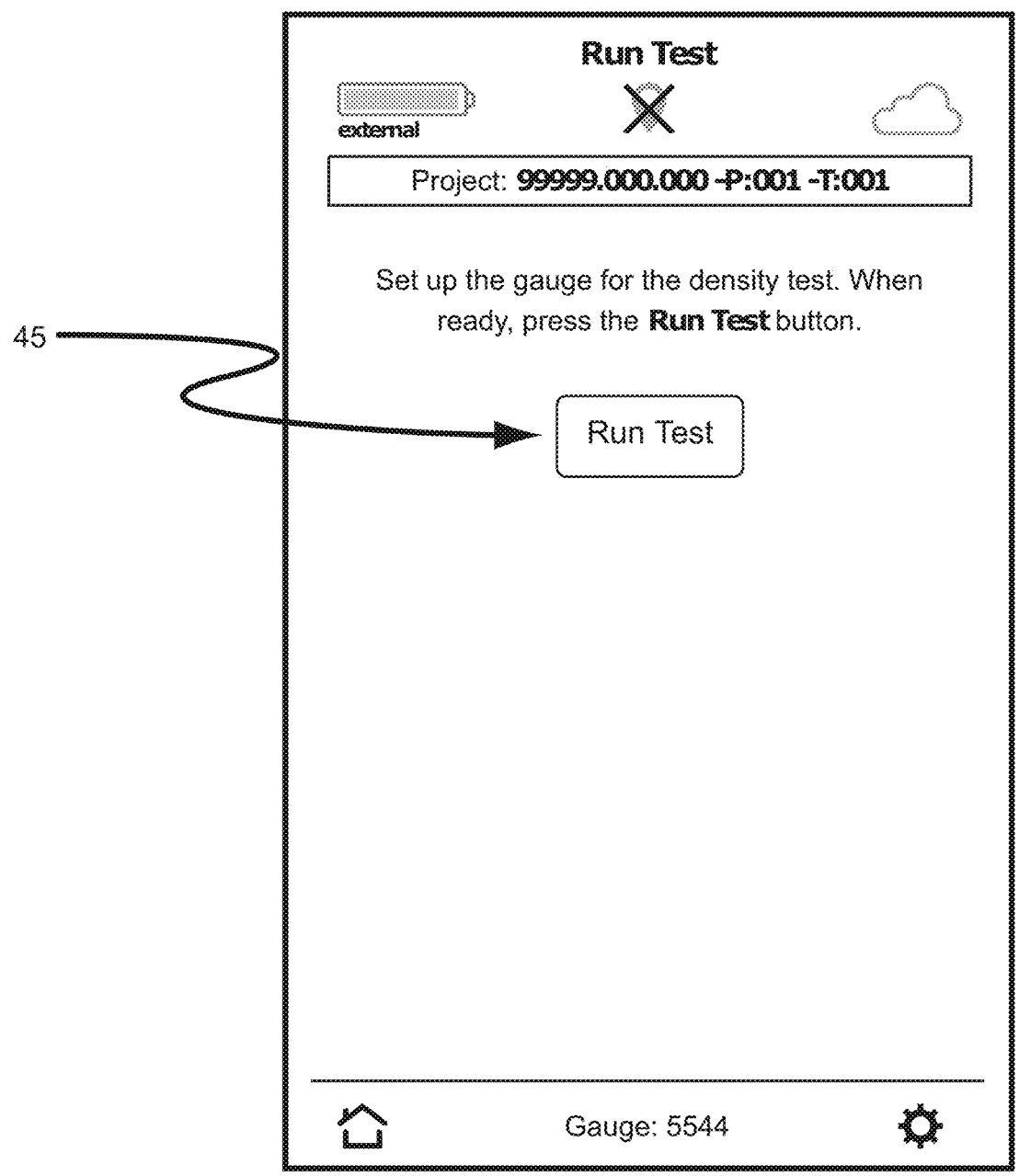
FIG. 13 shows an example confirmation screen user interface for the software used by the mobile device to interact with a controller.

FIG. 11 shows an example test data entry screen user interface for the software used by the mobile device to interact with a controller. In addition to the features called out in FIG. 8, the test data entry user interface screen can allow a user to enter various comments and select relevant parameters for the test to be performed in parameter fields 42, and press the "Prepare Test" button 43 to command the portable field measurement device to prepare to execute the test with the specified parameters. Some parameter fields 42 may be open-ended and accept any string input, some may be constrained to accept only input meeting a certain format (for example, numeric input only), and some may present the user with a selection of possible values, those values based on the project data for the selected project, the outcome of prior tests, or other sources of information. When the user selects the button to prepare a test 43, the interface may display a confirmation screen as shown in FIG. 13, prompting the user to position the portable field measurement device in preparation for a test, and presenting a confirmation button 45 which, when selected, directs the portable field measurement device to immediately execute the appropriate instructions to run the test as specified by the user; or alternatively the interface may direct the portable field measurement device to immediately execute the appropriate instructions to run the test as specified by the user. In this latter alternative, the "Prepare Test" button 43 may be labeled, for example, "Run Test". Upon completion of the test and receipt of the output data by the controller, the interface may display a textual, graphical, or other representation (or any combination thereof) of the output data from the test as shown in FIG. 14, which the user may then review, and may discard or upload to the online database by selecting the appropriate button on the interface.

FIG. 12 shows an example stored test screen user interface for the software used by the mobile device to interact with a controller. FIG. 12 shows a list of prior-run tests 44, which have been stored locally on the device, but not uploaded to a remote database. The user can select any of these tests to view detailed test results, upload the stored test, or delete it from the device. In some embodiments, the user may not be permitted to view detailed test results. In some embodiments, the user may not be permitted to delete stored tests from the device. In some embodiments, prior-run tests are uploaded to a remote database automatically.

FIG. 13 shows an example confirmation screen user interface for the software used by the mobile device to interact with a controller. FIG. 13 shows an example of a confirmation screen, prompting the user to position the portable field measurement device in preparation for a test, and presenting a confirmation button 45 which, when selected, directs the portable field measurement device to immediately execute the appropriate instructions to run the test as specified by the user. In some embodiments, the confirmation button 45 may be greyed out or disabled if an electrical connection with a portable field measurement device is not detected by the controller.

Figure 14:
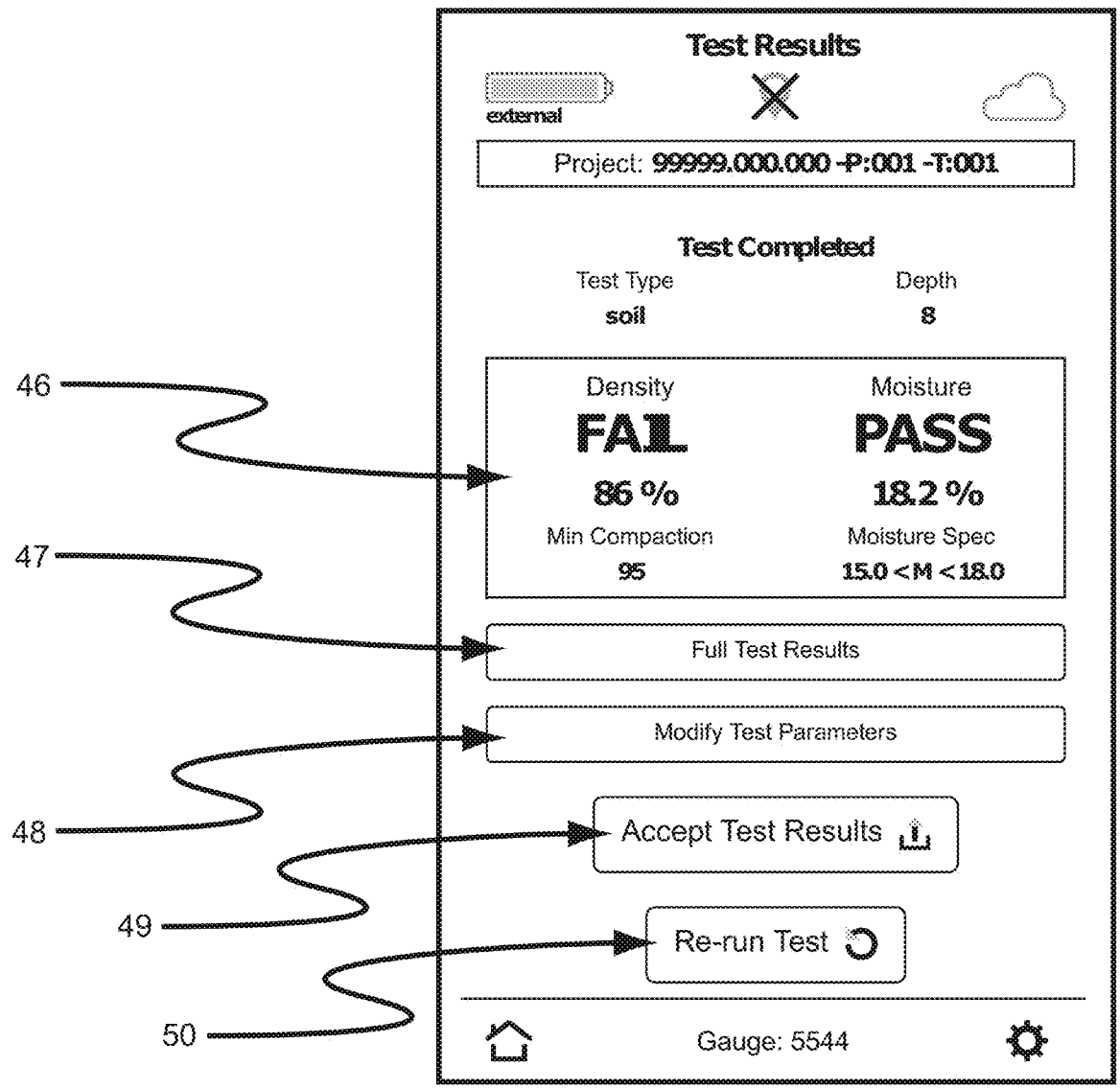
FIG. 14 shows an example test output screen user interface for the software used by the mobile device to interact with a controller.

FIG. 14 shows an example test output screen user interface for the software used by the mobile device to interact with a controller. FIG. 14 shows an embodiment of a textual representation of test data output summary 46 for the user's review. Upon review of the summary test results, a user may choose to examine the results in detail by selecting a button to display full test results 47, which will display the detailed, unedited, and/or "raw" output that has not yet been interpreted from the portable field measurement device. In some embodiments, the user may be presented with a button to modify test parameters 48 and recalculate the test results. In other embodiments, this functionality is excluded and the user must run a new test to alter the test parameters. If the user selects the button to accept test results 49, the test will either be stored locally on the device or, if a remote database is accessible, be uploaded to the remote database for storage. Additionally, for example, if the user selects the button to re-run the test 50, the interface can update to the test data entry screen as shown in FIG. 11.

FIGS. 15-18 illustrate an embodiment in which a portable field measurement device is mounted on a robotic apparatus which autonomously holds, positions, and operates portable field measurement device. In this specific example, the portable field measurement device is a nuclear density gauge. It should be appreciated that other portable field measurement devices may be held, positioned, or operated by similar robotic apparatuses. It should also be appreciated that other physical configurations of the robotic apparatus may be used to hold, position, or operate the portable field measurement device.

Figure 15:
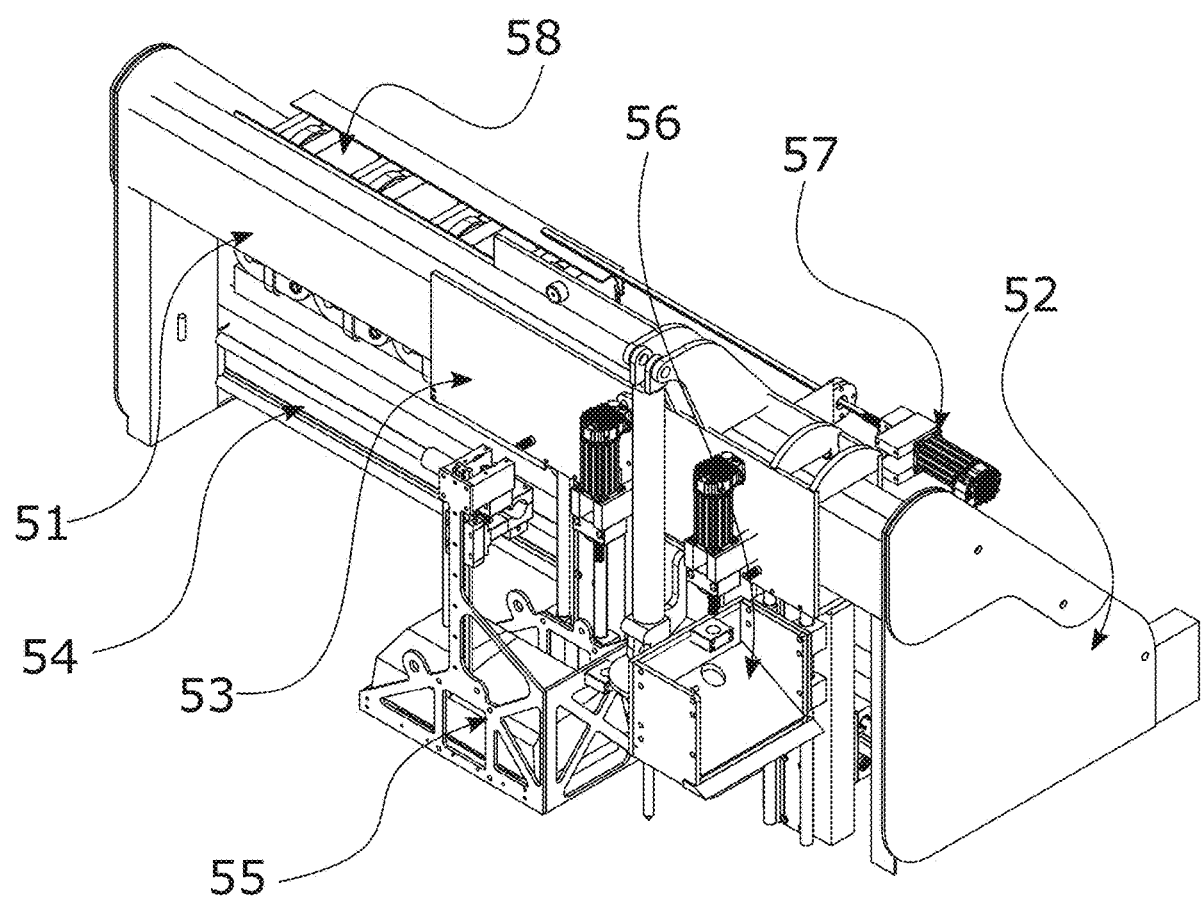
FIG. 15 illustrates a perspective view of a robotic apparatus, consisting of a load frame with a movable carriage, to which various attachments can be made to prepare the ground surface and position the portable field measurement device.

FIG. 15 shows a perspective view of a robotic apparatus, which consists of a load frame 51 that may, in some embodiments, be connected to the bucket of a conventional wheeled or tracked loader by side plates 52 on either side of the load frame 51. The loader equipment may be used to position the device onto the location to be tested and to provide a reaction force or dead weight to hold the robotic apparatus in contact with the ground when preparing the surface for a test, or while conducting a test, with a nuclear density gauge. A carriage 53 is attached to the load frame 51 and a lower frame and guide rail 54 to allow lateral translation of the carriage 53 in such a way that loads may be transferred from various attachments to the carriage 53, for example, a gauge cradle 55 or scrapper box 56, and to the load frame 51. The carriage travel may be actuated by a servomotor 57 which may be powered by a DC battery bank 58 or by another power supply. In some embodiments, the carriage travel may be hydraulically or pneumatically actuated. In some embodiments, the motions of the carriage 53 and the various attachments are controlled by a microcontroller or computer integrated with the robotic apparatus. In other embodiments, the operation of the robotic apparatus may be controlled by a microcontroller or computer of the loader equipment to which the apparatus is mounted, or by a separate microcontroller or computer.

Figure 16:
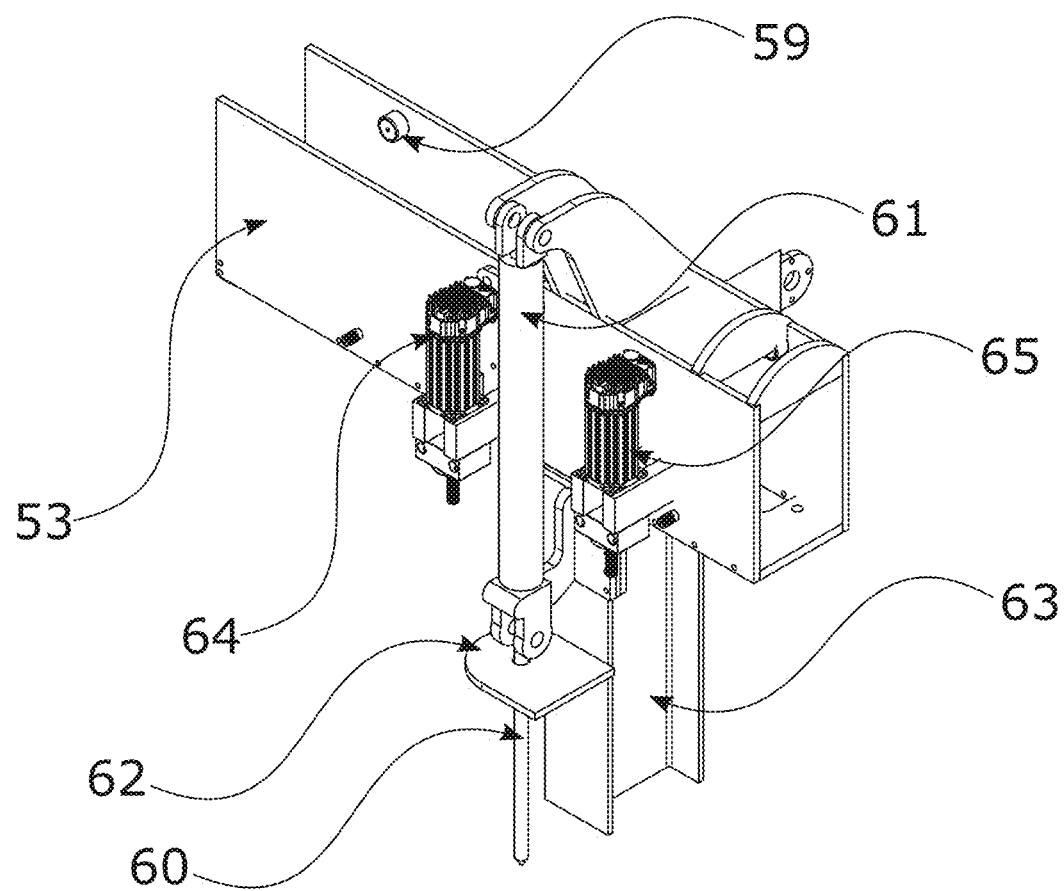
FIG. 16 illustrates a perspective view of a carriage component of the robotic apparatus of FIG. 15, with an attached drive pin powered by a hydraulic cylinder

FIG. 16 shows a perspective view of the carriage 53 of the robotic apparatus of FIG. 15 in greater detail. FIG. 16 shows one of several roller bearings 59 which guide the carriage 53 along the load frame 51. Directly mounted to the carriage 53 is a drive pin 60 which may be driven by a drive pin hydraulic piston 61 in to the ground surface to be tested by the nuclear density gauge. The lateral deviation of the drive pin 60 may be constrained by a drive pin guide plate 62 mounted to a guide post 63. In an alternative embodiment, the drive pin 60 may be driven electromechanically by a servomotor or other means. In some embodiments, the force required to drive the drive pin 60 into the ground, or to withdraw it from the ground, may be measured and recorded, either by monitoring continuously the position of the drive pin 60 and the hydraulic pressure applied to the drive pin hydraulic piston 61, or by various instruments or sensors which may be mounted to the robotic apparatus. Additionally, FIG. 16 shows servomotors which can actuate one or more attachments to the carriage 53. One of these is the gauge cradle servomotor 64 which can actuate a gauge cradle 55. Another is the scrapper box servomotor 65 which can actuate a scrapper box 56. In some embodiments, the attachments may be hydraulically or pneumatically actuated.

Figure 17:
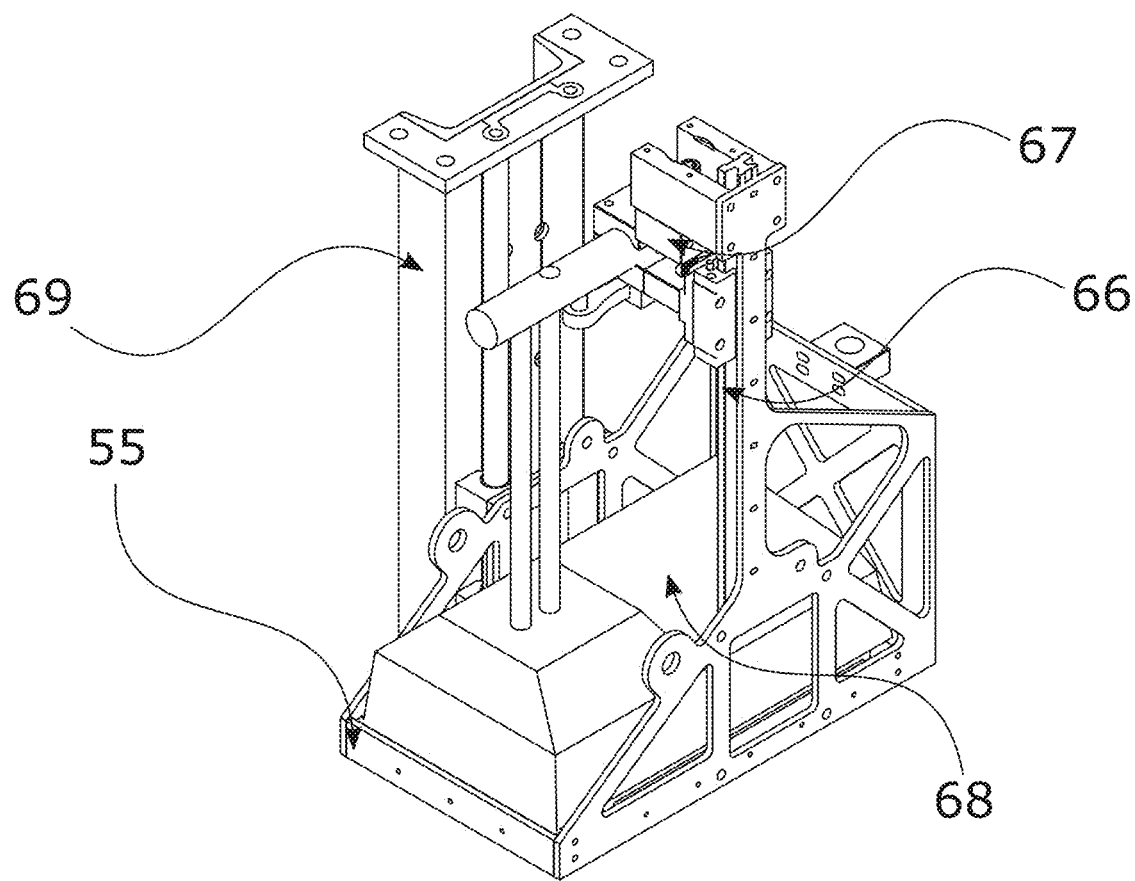
FIG. 17 illustrates a perspective view of a gauge cradle attachment of the robotic apparatus of FIG. 15.

FIG. 17 shows a perspective view of the gauge cradle 55 of the robotic apparatus of FIG. 15 in greater detail. The gauge cradle 55 comprises a slide rail 66 for the nuclear gauge's source rod, and actuation mechanism 67 for the nuclear gauge's source rod handle. A typical nuclear density gauge 68 is shown for reference but is not an integral component of the robotic apparatus, and may be removed. The gauge cradle 55 and associated components may be translated up or down along a gauge cradle guide post and slide rails 69 by the gauge cradle servomotor 64. In some embodiments, the gauge cradle may be hydraulically or pneumatically actuated. The gauge cradle guide post and slide rails 69 are designed to accept gauge cradles in various physical configurations to accept other portable field measurement devices.

Figure 18:
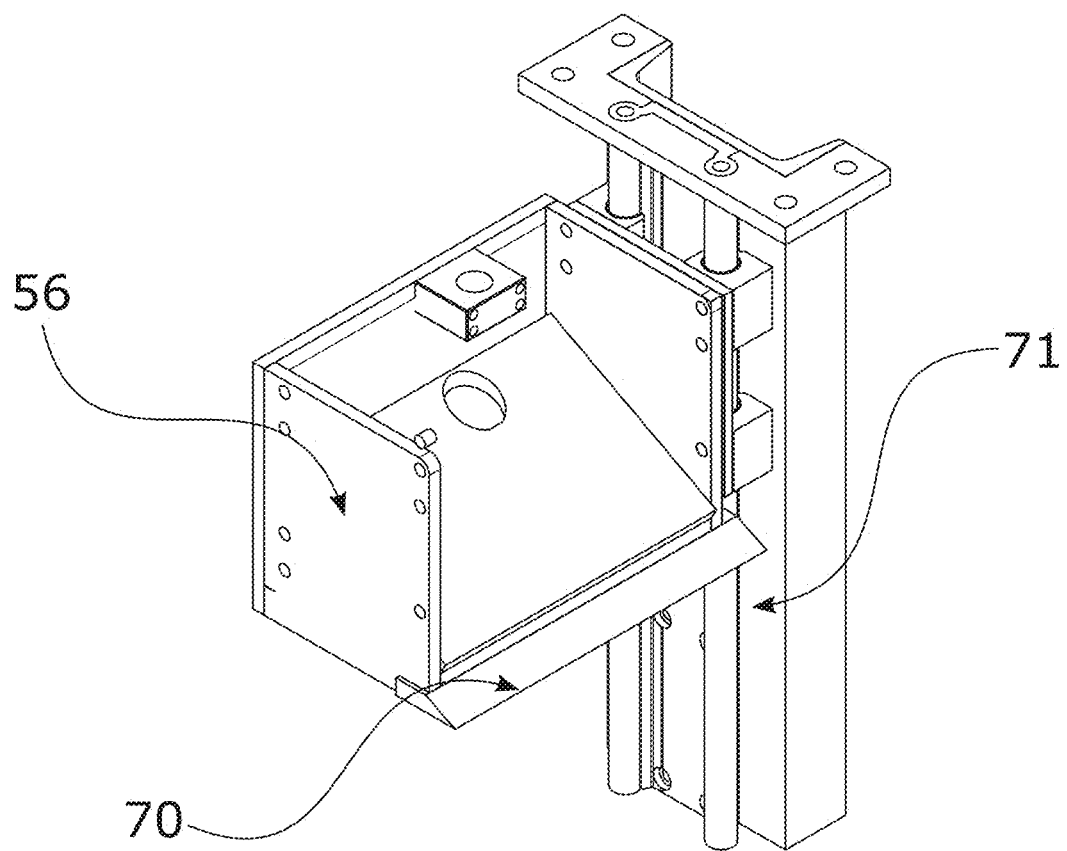
FIG. 18 illustrates a perspective view of a scrapper box attachment of the robotic apparatus of FIG. 15.

FIG. 18 shows a perspective view of the scrapper box 56 of the robotic apparatus of FIG. 15 in greater detail. The scrapper box 56 comprises a sharpened metal cutting edge 70. The scrapper box 56 may be translated up or down along a scrapper box guide post and slide rails 71. By incrementally lowering the scrapper box 56 while repeatedly translating the carriage 53 left and right over the same area to be tested, a flat and uniform surface may be cut into the material to be tested by the nuclear density gauge. When a flat and uniform surface has been achieved, the scrapper box 56 may be lifted, and the carriage 53 translated until the drive pin 60 is over the flat and uniform surface. Then the drive pin 60 may be driven into the material to be tested and subsequently withdrawn, to create a small diameter hole in the material to be tested. The carriage 53 may then be translated to position the gauge cradle 55 over the hole, and the gauge cradle 55 lowered until the nuclear density gauge is in firm contact with the flat and uniform surface of the material to be tested. The actuation mechanism 67 may then lower the nuclear density gauge source rod into the hole, enabling the nuclear density gauge to conduct the desired test.

Additional Implementation Details

Various embodiments of the present disclosure may be a system, a method, and/or a computer program product at any possible technical detail level of integration. A computer program product may include a computer readable storage medium (or mediums) having computer readable program instructions thereon for causing a processor to carry out aspects of the present disclosure.

For example, the functionality described herein may be performed as software instructions that are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The block diagram in the Figures illustrates the architecture, functionality, and operation of possible implementations of systems, methods, and computer program products according to various embodiments of the present disclosure. In this regard, each block in the block diagram may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagram illustration, and combinations of blocks in the block diagram illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 19:
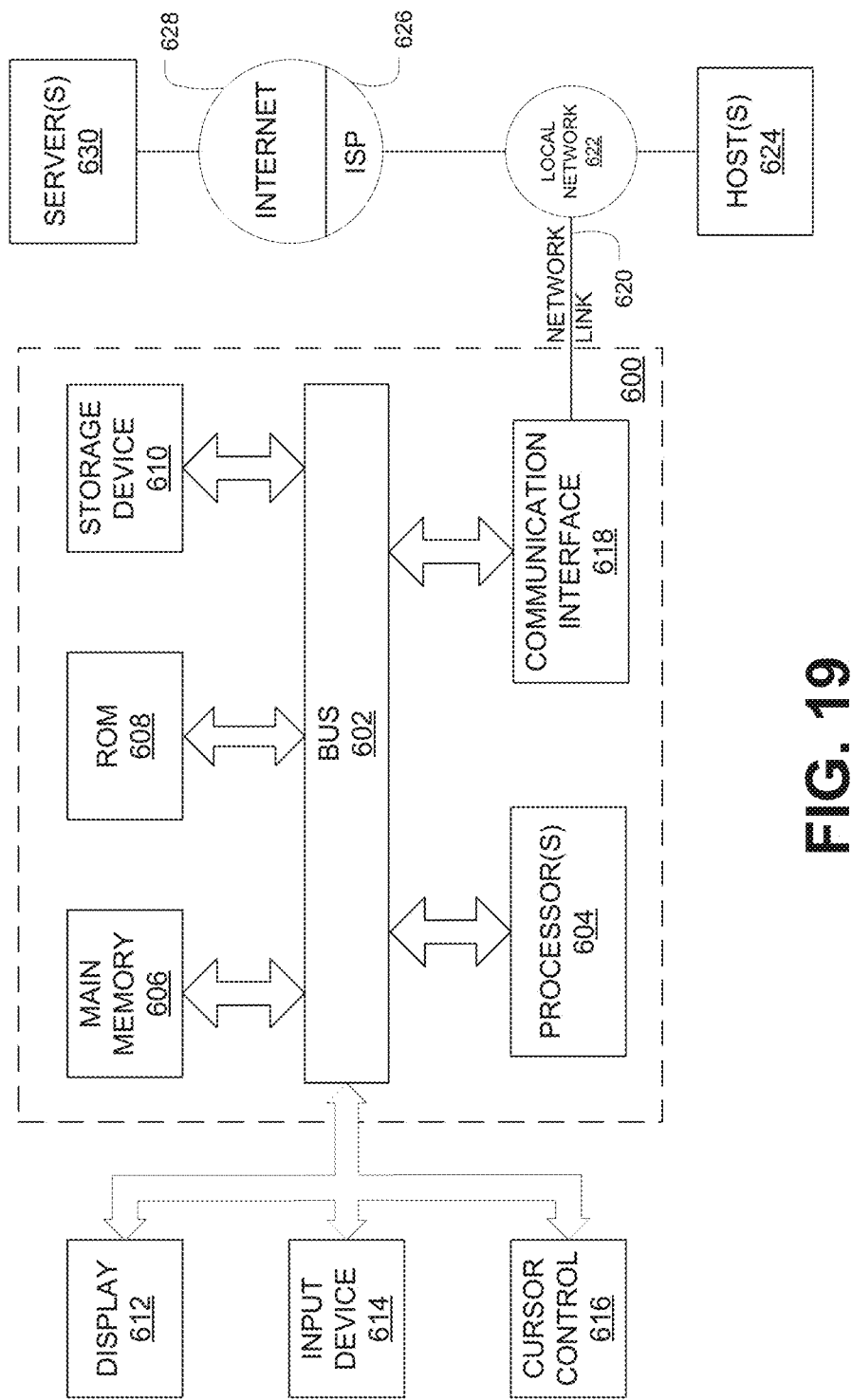
FIG. 19 illustrates a block diagram of a computer system, according to various embodiments of the present disclosure.

For example, FIG. 19 is a block diagram that illustrates a computer system 600 upon which various embodiments may be implemented. Computer system 600 may be similar, or have similar components, to the software operating the device described herein. Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 808 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 may be coupled via bus 602 to a display 612, such as a cathode ray tube (CRT) or LCD (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 600 may include a user interface module to implement a GUI that may be stored in a mass storage device as computer executable program instructions that are executed by the computing device(s). Computer system 600 may further, as described below, implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

Various forms of computer readable storage media may be involved in carrying one or more sequences of one or more computer readable program instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Although the forgoing inventions have been described in terms of certain preferred embodiments, other embodiments will become apparent to those of ordinary skill in the art in view of the disclosure herein. Furthermore, the skilled artisan will recognize the interchangeability of various features of one modification of the winding board to another modification. Accordingly, the present inventions are not intended to be limited by the recitation of preferred embodiments, but are intended to be defined solely by the reference to the appended claims.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present inventions herein disclosed should not be limited by the particular disclosed embodiments described above.

What is claimed is:

1. A controller for controlling a portable field measurement device, the controller comprising:

an attachment mechanism configured to couple to a compatible receiving mechanism on the portable field measurement device;
a geolocation sensor;
a first communication interface configured to communicate with the portable field measurement device;
a second communication interface configured to communicate with a mobile device;
one or more data storage devices configured to store:
test results; and
a plurality of computer-executable instructions;
one or more hardware computer processors, in communication with the one or more data storage devices, that when executing the plurality of computer executable instructions, are configured to:
electronically couple, via the first communication interface, to the portable field measurement device such that the controller and the portable field measurement device electronically communicate, wherein the portable field measurement device is physically positioned to be able to test a first material;
couple, via the attachment mechanism, the controller to the portable field measurement device to the receiving mechanism;
electronically couple, via the second communication interface, to a mobile device;
store geolocation data output by the geolocation sensor;
access, via the mobile device, a test request comprising testing criteria;
actuate one or more keypresses on a keypad of the portable field measurement device based at least in part on the test request so that the portable field measurement device runs the testing procedure on the first material;
receive, via the first communication interface, test data from the portable field measurement device;
generate and store, in one or more data storage devices, test results based at least in part on the test data and the geolocation data;
generate and transmit, to the mobile device via the second communication interface, instructions for display of the test results on a graphical user interface associated with the mobile device.

2. The controller of claim 1, wherein the portable field measurement device is a device for measuring the physical properties of at least one of: soil, sand, asphalt, asphaltic concrete, concrete, cement, steel, reinforcing steel, iron, or any aggregate materials.

3. The controller of claim 2, wherein the physical properties include at least one of: moisture content or density.

4. The controller of claim 1, wherein the portable field measurement device is a nuclear density gauge.

5. The controller of claim 4, wherein the nuclear density gauge is positioned and actuated by a remotely operated robotic apparatus.

6. The controller of claim 1, wherein the second communication interface between the controller and the mobile device comprises one or more of: Bluetooth, Wi-Fi, or cellular radio technology.

7. The controller of claim 1, wherein the geolocation sensor comprises a Global Navigation Satellite Systems (GNSS) receiver and antenna.

8. The controller of claim 7, wherein the controller is further configured to receive Global Navigation Satellite Systems (GNSS) position corrections from a GNSS reference base station or Networked Transport of RTCM via Internet Protocol (NTRIP) caster.

9. The controller of claim 8, wherein the Global Navigation Satellite Systems (GNSS) position corrections are received via one or more radio signals or the Internet.

10. The controller of claim 8, wherein the one or more physical properties includes moisture or density.

11. The controller of claim 1, wherein the testing criteria includes criteria for measuring one or more physical properties of the first material.

12. The controller of claim 1, wherein the one or more processors are further configured to:
detect, via a detection sensor, feedback by the portable field measurement device based on actuated one or more keypresses by monitoring any visual or audible feedback emitted by the portable field measurement device.

13. The controller of claim 12, wherein the detection sensor measures the response of a piezoelectric sounder.

14. The controller of claim 1, wherein the first communication interface comprises a direct wired connection.

15. The controller of claim 1, wherein the one or more hardware computer processors are further configured to transmit the test data output from the portable field measurement device to a remote database.

16. The controller of claim 15, wherein the test data transmitted is transmitted via an Internet connection, wherein the Internet connection is mediated by the mobile device or the controller.

17. The controller of claim 1, wherein the one or more hardware computer processors are further configured to identify a user based at least in part on information associated with hardware components of the mobile device.

18. The controller of claim 1, wherein the actuation of one or more keypresses on the keypad of the portable field measurement device is performed by closing analog switches to make contact between one or more rows and one or more columns in the keypad matrix of the portable field measurement device.

19. The controller of claim 1, wherein the actuation of one or more keypresses on the keypad of the portable field measurement device is performed by mimicking the output of a physical keypad via a serial or $I^2C$ interface.

20. A computer-implemented method comprising:
electronically coupling, via a first communication interface, to the portable field measurement device such that the controller and the portable field measurement device electronically communicate, wherein the portable field measurement device is physically positioned to be able to test a first material;
coupling, via an attachment mechanism configured to couple to a compatible receiving mechanism on the portable field measurement device, the controller to the portable field measurement device to the receiving mechanism;
electronically coupling, via a second communication interface, to a mobile device;
storing geolocation data output by a geolocation sensor;
accessing, via the mobile device, a test request comprising testing criteria;
actuating one or more keypresses on a keypad of the portable field measurement device based at least in part on the test request so that the portable field measurement device runs the testing procedure on the first material;
receiving, via the first communication interface, test data from the portable field measurement device;

generating and storing, in one or more data storage devices, test results based at least in part on the test data and the geolocation data;

generating and transmitting, to the mobile device via the second communication interface, instructions for display of the test results on a graphical user interface associated with the mobile device.

* * * * *